United States Patent [19]
Miyamae

[11] Patent Number: 5,474,662
[45] Date of Patent: Dec. 12, 1995

[54] APPARATUS FOR PRODUCING ELECTROLYZED WATER

[75] Inventor: Kazuhiro Miyamae, Machida, Japan

[73] Assignee: Miz Co., Ltd., Kanagawa, Japan

[21] Appl. No.: 251,561

[22] Filed: May 31, 1994

[30] Foreign Application Priority Data

May 31, 1993 [JP] Japan .................. 5-129842

[51] Int. Cl.$^6$ .................. C02F 1/46; C25B 9/00
[52] U.S. Cl. .................. 204/257; 204/269; 204/263
[58] Field of Search .................. 204/275, 255, 204/257, 269, 263, 264–266

[56] References Cited

U.S. PATENT DOCUMENTS

| | | | |
|---|---|---|---|
| 1,541,947 | 6/1925 | Hartman et al. | 204/269 X |
| 1,674,364 | 6/1928 | Hartman | 204/269 |
| 3,119,760 | 1/1964 | Foreman et al. | 204/269 |
| 3,669,857 | 6/1972 | Kirkham et al. | 204/151 |
| 4,336,122 | 6/1982 | Spirig | 204/269 X |
| 4,495,048 | 1/1985 | Murakami et al. | 204/269 X |
| 4,649,091 | 3/1987 | McElroy | 429/34 |
| 4,678,724 | 7/1987 | McElroy | 429/34 |
| 4,915,803 | 4/1990 | Morris | 204/128 |
| 5,055,170 | 10/1991 | Saito | 204/228 |
| 5,192,411 | 3/1993 | Vom Bauer et al. | 204/280 |
| 5,234,563 | 8/1993 | Arai et al. | 204/229 |

FOREIGN PATENT DOCUMENTS

| | | |
|---|---|---|
| 0203657 | 12/1986 | European Pat. Off. . |
| 0396107 | 11/1990 | European Pat. Off. . |
| 0437842A1 | 7/1991 | European Pat. Off. . |
| 0601284A2 | 6/1994 | European Pat. Off. . |
| 3321984A1 | 6/1982 | Germany . |

*Primary Examiner*—Donald R. Valentine
*Attorney, Agent, or Firm*—Woodcock, Washburn, Kurtz, Mackiewicz & Norris

[57] ABSTRACT

An apparatus for producing electrolyzed water comprising an electrolytic cell, wherein the electrolytic cell includes an anode plate having a through-hole, a cathode plate having a through-hole and a sealing member. The electrolytic cell is constructed of the anode plate, the cathode plate, and the sealing member with the sealing member interposed between the anode plate and the cathode plate. Thereby a electrolytic chamber for electrolyzing subject water to be electrolyzed is defined between the anode plate and the cathode plate. One of the through-holes of the anode plate and the cathode plate serves as an inlet for introducing the subject water into the electrolytic chamber, the other through-hole serves as an outlet for discharging the subject water into the electrolytic chamber.

8 Claims, 28 Drawing Sheets

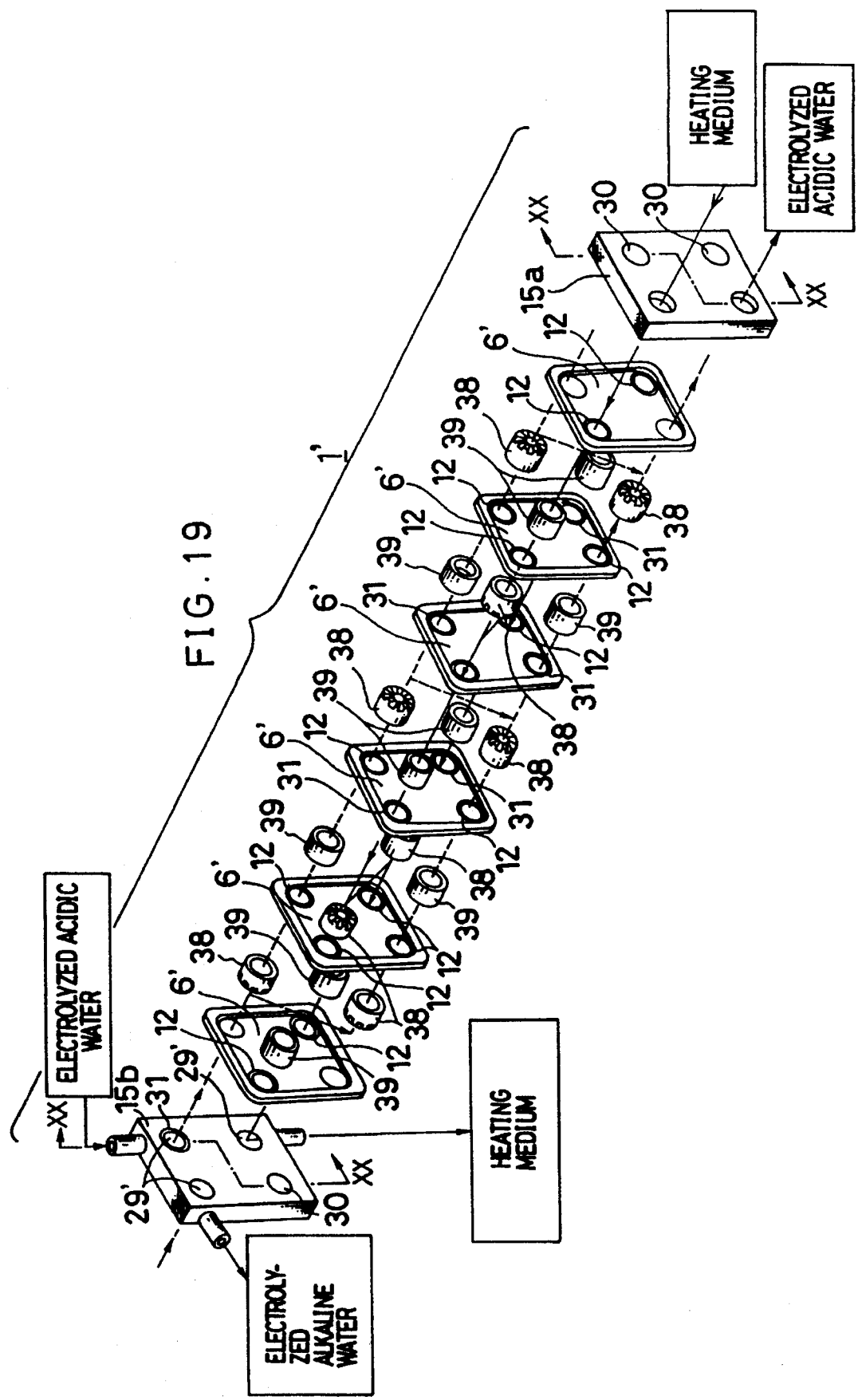

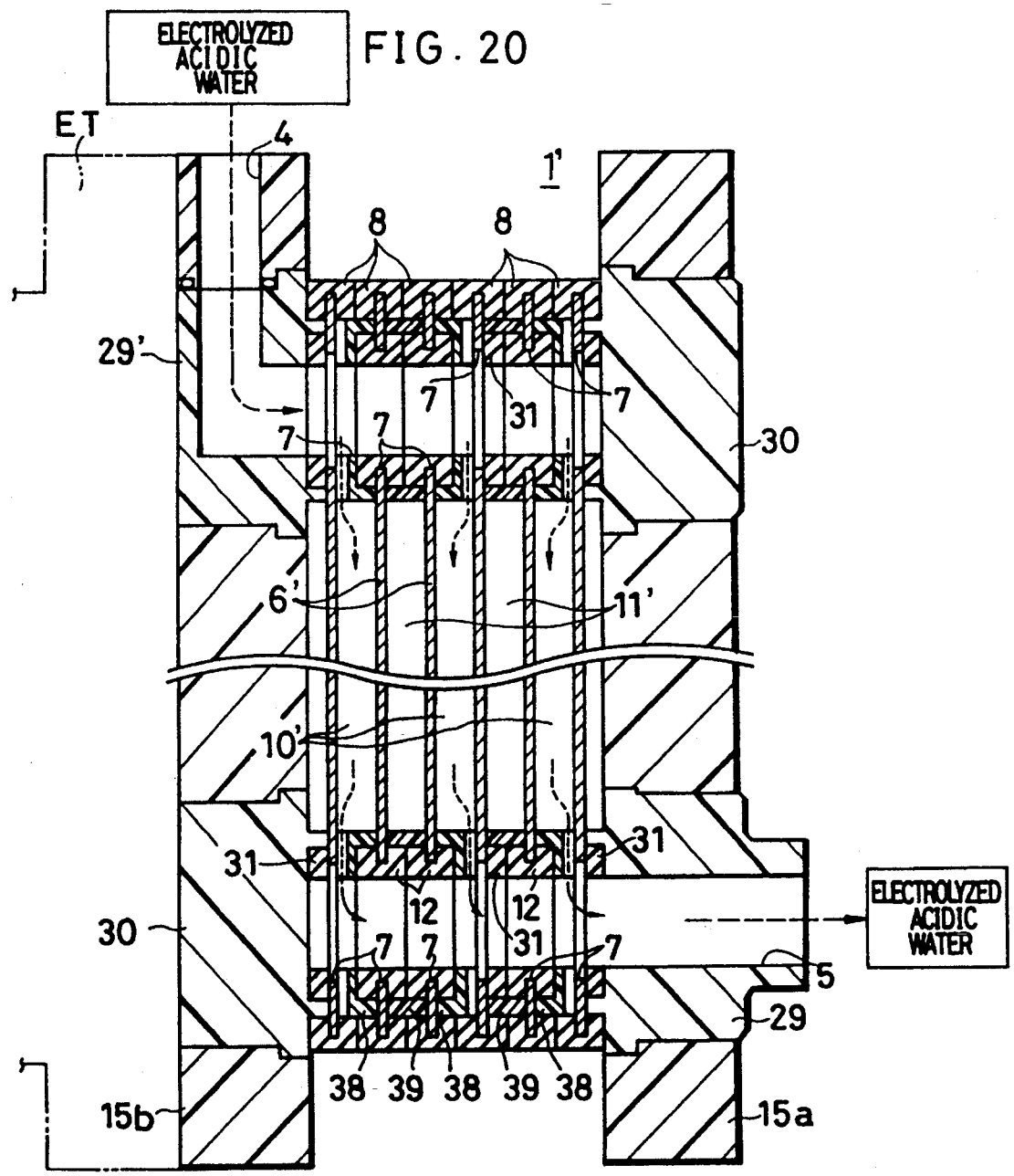

5,474,662

APPARATUS FOR PRODUCING ELECTROLYZED WATER

BACKGROUND OF THE INVENTION

1. Field of the Invention

The present invention relates to an apparatus for producing electrolyzed water for separating liquid such as water (which will be referred to as subject water to be electrolyzed, or simply subject water hereinafter) by electrolysis into electrolyzed acidic water and electrolyzed alkaline water, or for merely electrolyzing liquid such as water to produce electrolyzed water.

2. Description of the Related Art

The apparatus for producing electrolyzed acidic water and electrolyzed alkaline water are shown, for example, in U.S. Pat. Nos. 5,055,170 and 5,234,563.

In the apparatus for producing electrolyzed water of this type, the subject water to be electrolyzed such as city water is supplied into the electrolytic cell, and DC current is supplied to between anode and cathode plates. Then, an electrolysis of the water is carried out in the electrolytic cell and as a result, the concentration of hydrogen ion is increased in an area adjacent the anode plate to provide electrolyzed acidic water, while the concentration of hydroxide ion is increased in an area adjacent the cathode plate to provide alkaline water.

In this case, factors governing the pH (potential of Hydrogen) value of the electrolyzed water produced by electrolysis are the flow rate (by volume) of subject water which flows through the electrolytic cell, the current density across the electrode plates and the time of contact of the subject water with the electrode plates. In other words, the pH value of the electrolyzed water, the flow rate and the sizes of components of the electrolyzed water producer(such as the electrolytic cell, the electrode plates and a power source) are influenced by one another.

For this reason, when the amount of electrolyzed water discharged per unit time is intended to be increased while maintaining a desired pH value, it is necessary to supply a large amount of electric power to the subject water, and it is a conventional practice to increase the size of the power source, or to increase the area of the electrode plate, or to provide a large number of electrode plates.

However, for example, when the electrolyzed water is put into use as drinking water or for disinfection or sterilization, or into a domestic use, a business use or an industrial use, the conditions demanded such as the pH value, the discharge amount per unit time and the like are diverse dependent upon the application of the electrolyzed water producer and hence, in the prior art electrolyzed water producer, components such as the electrolytic cell, the electrode plates, the power source and the like must be designed and produced at each time in a specification meeting the demand.

For this reason, a lot of time is required for designing each component, and huge costs are required for equipments such as a mold for producing each component, a fabricating equipment and the like. In addition, the number of exclusively used components is increased and hence, even during assembling, the management for the components is troublesome. As a result, it is difficult to timely provide apparatus for producing electrolyzed water and to realize a reduction in cost. Particularly, notwithstanding that super electrolyzed water such as super acidic water is extremely excellent in a social contribution for a medical use, there is a problem that the apparatus for producing electrolyzed water can be provided only as remaining expensive.

Such electrolyzed acidic water or electrolyzed alkaline water is used in a wide range, for example, as drinking water and for washing of face, sterilization, cleaning and the like and from this respect, it may be desired to be delivered at a desired temperature in some cases.

However, the temperature of the electrolyzed water is risen relative to the temperature of subject water by the electrolysis and hence, it is necessary to cool the produced electrolyzed water again at the delivery time. In addition, the conductivity of the subject water is influenced by the temperature of the subject water and hence, even if the electrolyzed water is desired to be delivered as cold water, it may be desirable in respect of the electrolytic efficiency in some cases that the subject water is electrolyzed at a temperature higher than the temperature of the delivered water.

The prior art apparatus for producing electrolyzed water has no heating and cooling functions, and in order to adjust the temperature of the produced electrolyzed water or the subject water supplied, it is necessary to specially dispose a heater and/or a cooler in juxtaposition with the apparatus. In this case, the heater and the cooler are exclusively used and need to be designed and fabricated at each time in accordance with the specification of the apparatus for producing electrolyzed water.

On the other hand, it is known that at a pH value equal to or higher than 8, most of an aqueous solution of hypochlorous acid containing residual free chlorine is dissociated into hypochlorite ion $OCl^-$ to exhibit a significantly reduced sterilizing power, as compared with hypochlorous acid HClO, but at a pH value in a range of from 3 to 7, the aqueous solution of hypochlorous acid is maintained in the form of hypochlorous acid HClO to exhibit a drastically increased sterilizing power. An aqueous solution of hypochlorous acid having, for example, a pH value in a range of from 3 to 7, even if it has a concentration of residual chlorine therein as low as 30 to 60 ppm, provides a sterilizing effect equivalent to that of an aqueous solution of hypochlorous acid having a pH value of 8 and a residual chlorine concentration of 200 ppm. Thus, in providing such an equivalent sterilizing effect, the amount of chlorine added can be reduced, if the pH value is controlled appropriately.

There is a conventionally known method for producing sterilizing water of such a type, which comprises mixing water containing sodium chloride added therein with water containing chlorine added therein and subjecting a resulting mixture to an electrolysis in an electrolytic cell having no membrane, as described, for example, in Japanese Patent Application Laid-open No.237,478/93.

In this method, however, the concentration of residual chlorine can be controlled by adjusting the quantity of electricity and the amount of chlorine ion added, but if conditions for a producing apparatus such as the size of the electrolytic cell and the size and arrangement of electrode plates (particularly, a distance between the electrode plates) are determined, the quantity of electricity applied to subject water is fixed and from this respect, it is an only means to control the concentration of residual chlorine by adjusting the amount of chlorine ion added. For this reason, a given limit exists in the range of controlling the concentration of residual chlorine.

In addition, in this method, the contents of chlorine gas, hypochlorous acid and hypochlorite ion present in an aqueous solution of hypochlorous acid after electrolysis are controlled by the amount of chloric acid added to subject water. Therefore, this method is suitable for producing a solution having a large content of hypochlorous acid excellent in sterilizing effect, but in this method, it is difficult to produce, for example, weakly acidic sterilizing water having a pH value on the order of 7 to 8 and strongly acidic sterilizing water having a pH value on the order of 2.

SUMMARY OF THE INVENTION

It is an object of the present invention to provide an apparatus for producing electrolyzed water in which the number of parts or components are reduced and which is adapted for all applications without any increase in number of parts or components even in different specifications.

It is another object of the present invention to provide an apparatus for producing electrolyzed water in which each of the electric current flowing between the electrodes and the energization time can be changed into an any value by taking account of the number of electrode plates put together, or by taking account of the thickness of the sealing member mounted around the outer peripheral edge of the electrode plate, even if the amount of chlorine ion added is constant.

It is further object of the present invention to provide an apparatus for producing electrolyzed water in which each of the temperatures of the electrolyzed water and the subject water to be electrolyzed can be set at a desired value.

According to the present invention, there is provided an apparatus for producing electrolyzed water: comprising an electrolytic cell,
  wherein said electrolytic cell includes a first electrode plate having a first through-hole, a second electrode plate having a second through-hole, and a sealing member,
  said electrolytic cell is constructed of said first electrode plate, said second electrode plate and said sealing member, with said sealing member interposed between said first and second electrode plates, to define, between said first and second electrode plates, an electrolytic chamber for electrolyzing subject water to be electrolyzed therein,
  the first through-hole serves as an inlet for introducing subject water into the electrolytic chamber,
  the second through-hole serves as an outlet for discharging electrolyzed water out of the electrolytic chamber,
  said first electrode plate is connectable to one of an anode and a cathode, and
  said second electrode plate is connectable to the other of the anode and the cathode.

According to the present invention, there is provided an apparatus for producing electrolyzed water wherein the electrolytic cell further including a chlorine supply source for producing an aqueous solution of hypochlorous acid.

According to the present invention, there is provided an apparatus for producing electrolyzed water further comprising a heat exchanger connected for providing a heat exchange between the subject water supplied into the electrolytic chamber or the electrolyzed water produced in the electrolytic chamber and a heating medium, or between the subject water and the electrolyzed water.

In the apparatus for electrolyzed water according to the present invention, the anode and cathode plates are formed of the electrode plates of the same shape. The sealing member is fitted around the peripheral edge of each of the electrode plates and then, the electrolytic cell is assembled by putting the electrode plates together. Thus, the electrolytic cell is constructed and hence, a vessel for the electrolytic cell is not required, as in the prior art. All the electrode plates are of the same plates, and all the sealing members are of the same members too, thereby providing a large reduction in cost by a reduction in number of components.

The flow passage for the subject water is provided by provision of through-holes opened in the electrode plates forming the anode and cathode plates to permit a flow of the subject water. Particularly, if any of various sealing plugs depending upon an application is mounted in the through-hole, the flow passage pattern can be varied.

If a membrane plate is disposed between the anode and cathode plates, an anode chamber is formed between the anode and the membrane plates, while a cathode chamber is formed between the cathode and the membrane plate, so that electrolyzed acidic water and electrolyzed alkaline water can be separated and removed.

In the apparatus for producing electrolyzed water according to the present invention, a heat exchanger may be connected for providing a heat exchange between the subject water supplied to the electrolyzing chamber or the electrolyzed water produced in the electrolyzing chamber and a heating medium or between the subject water supplied to the electrolyzing chamber and the electrolyzed water produced in the electrolyzing chamber. Therefore, each of the temperatures of the electrolyzed water and the subject water to be electrolyzed can be set at a desired value.

A heat exchange cell in the heat exchanger may be assembled by putting together (i.e., laminating) the partition plates of the same shape each having a sealing member fitted around a peripheral edge thereof and may be provided with an inlet and an outlet, so that subject water to be heat-exchanged and a heating medium are supplied through the inlet into the heat exchange cell and discharged through the outlet from the heat exchange cell. Thus, a special vessel for the heat exchange cell is not required, as in the electrolytic cell. Moreover, all the partition plates are of the same members and the sealing members are of the same members, thereby providing a large reduction in cost by a reduction in number of components.

In this case, if the partition plate is formed from a plate of the same shape as the electrode plate in the apparatus for producing electrolyzed water, respective general-purpose effects of the apparatus and the heat exchanger are further promoted. The partition plate of the heat exchanger is not deteriorated by energization. Therefore, if the electrode plates in the electrolytic cell have been deteriorated, such electrode plates and the partition plates in the heat exchanger may be replaced by each other, or the electrode plates deteriorated in the electrolytic cell may be removed and used as the partition plates in the heat exchanger, and new electrode plates may be mounted in the electrolytic cell, leading to an prolonged life of the apparatus for producing electrolyzed water.

In the apparatus for producing electrolyzed water according to the present invention, the electrolyzing chamber formed by putting the electrode plates and the membrane plates together in any combination consists of the anode chamber formed between the anode plate and the membrane plate, the cathode chamber formed between the cathode plate and the membrane plate, and a membraneless electrolyzing chamber.

In this case, if the subject water is electrolyzed while being supplied through the inlet into the electrolyzing chambers and discharged through the outlet from the electrolyzing chambers, chlorine ion Cl⁻ of sodium chloride added in the subject water is subjected, in an area adjacent the anode, to a reaction represented by a following reaction formula:

$$2\ Cl^- \rightarrow Cl_2 + 2\ e^-$$

to produce chlorine gas. Further, this chlorine gas is dissolved into the subject water and converted into hypochlorous acid HClO through a reaction represented by a following reaction formula:

$$Cl_2 + H_2O \rightarrow H^+ + Cl^- + HClO$$

In this case, the concentration of residual chlorine (or the amount of chlorine generated) is governed by a product of the electric current flowing between the electrodes and the energization time (i.e., a quantity of electricity), and by the amount of chlorine ion added. However, because the membraneless electrolyzing chamber is formed by putting the anode and cathode plates together, even if the amount of chlorine ion added is constant, each of the electric current flowing between the electrodes and the energization time can be changed into an any value by taking account of the number of electrode plates put together, or by taking account of the thickness of the sealing member mounted around the peripheral edge of the electrode plate. Therefore, in cooperation with the control of the amount of chlorine ion added, it is possible to more finely control the concentration of residual chlorine.

In the anode chamber, formed between the anode plate and the membrane plate, of the electrode chambers formed by provision of the membrane plate between the anode and cathode plates, a following reaction:

$$2\ H_2O \rightarrow 4\ H^+ + O_2\uparrow + 4\ e^-$$

occurs, so that the concentration of hydrogen ion is increased to produce electrolyzed acidic water. On the other hand, in the cathode chamber formed between the cathode plate and the membrane plate, a following reaction:

$$2\ H_2O \rightarrow 4\ H^+ + O_2\uparrow + 4\ e^-$$

occurs, so that the concentration of hydroxide ion is increased to produce electrolyzed alkaline water. In this case, the pH values of the electrolyzed acidic water and the electrolyzed alkaline water can be controlled by adjusting the quantity of electricity applied to the subject water, but because either the anode and cathode chambers in the apparatus for producing electrolyzed water according to the present invention are formed by the lamination of the anode and cathode plates with the membrane plate interposed therebetween, the electric current flowing between the electrodes and the energization time, i.e., the quantity of electricity can be changed to any value by taking account of the number of the electrode and membrane plates laminated, or by taking account of the thickness of the sealing member mounted around the peripheral edge of the electrode plate. Therefore, even if a pH controlling additive such as hydrochloric acid is not added, the pH value of the subject water can be controlled finely.

If the above-described membraneless electrolyzing chamber and the anode and cathode chambers are provided in any combination, the pH value of electrolyzed water produced in the membraneless electrolyzing chamber and containing chlorine (hypochlorous acid) can be controlled into any values in the anode and cathode chambers, respectively.

For example, when electrolyzed water having a large content of hypochlorous acid and a large pH value in a range of 3 to 7 is produced, the concentration of residual chlorine is controlled in the membraneless electrolyzing chamber, and the pH value of an aqueous solution of hypochlorous acid produced in the membraneless electrolyzing chamber is controlled into a value in a range of 3 to 7 in the anode chamber. The electrolyzed water produced in this manner exhibits a large sterilizing effect at a small amount of chlorine ion added, because of a large content of hypochlorous acid excellent in sterilizing effect.

When it is desired to inhibit the corrosive property to a pumping system or piping system for the electrolyzed water, it is preferable that the pH value of an aqueous solution of hypochlorous acid produced in the membraneless electrolyzing chamber is controlled into a weakly alkaline value on the order of 7 to 8 in the cathode chamber. This eliminates the need for a special corrosion preventing treatment applied to the pumping system and the piping system.

BRIEF DESCRIPTION OF THE DRAWINGS

Further objects and advantages of the invention can be more fully understood from the following detailed description taken in conjunction with the accompanying drawings in which:

FIGS. 3 to 7 are views showing main components constituting the apparatus for producing electrolyzed water shown in FIG. 1, respectively, wherein

FIG. 19 is an exploded perspective view of a heat exchanger according to the present invention;

FIG. 20 is a sectional view of an essential portion of the heat exchanger, taken along a line XX—XX shown in FIG. 19;

DESCRIPTION OF THE PREFERRED EMBODIMENTS

The present invention will now be described by way of preferred embodiments in connection with the accompanying drawings.

Figure 1:
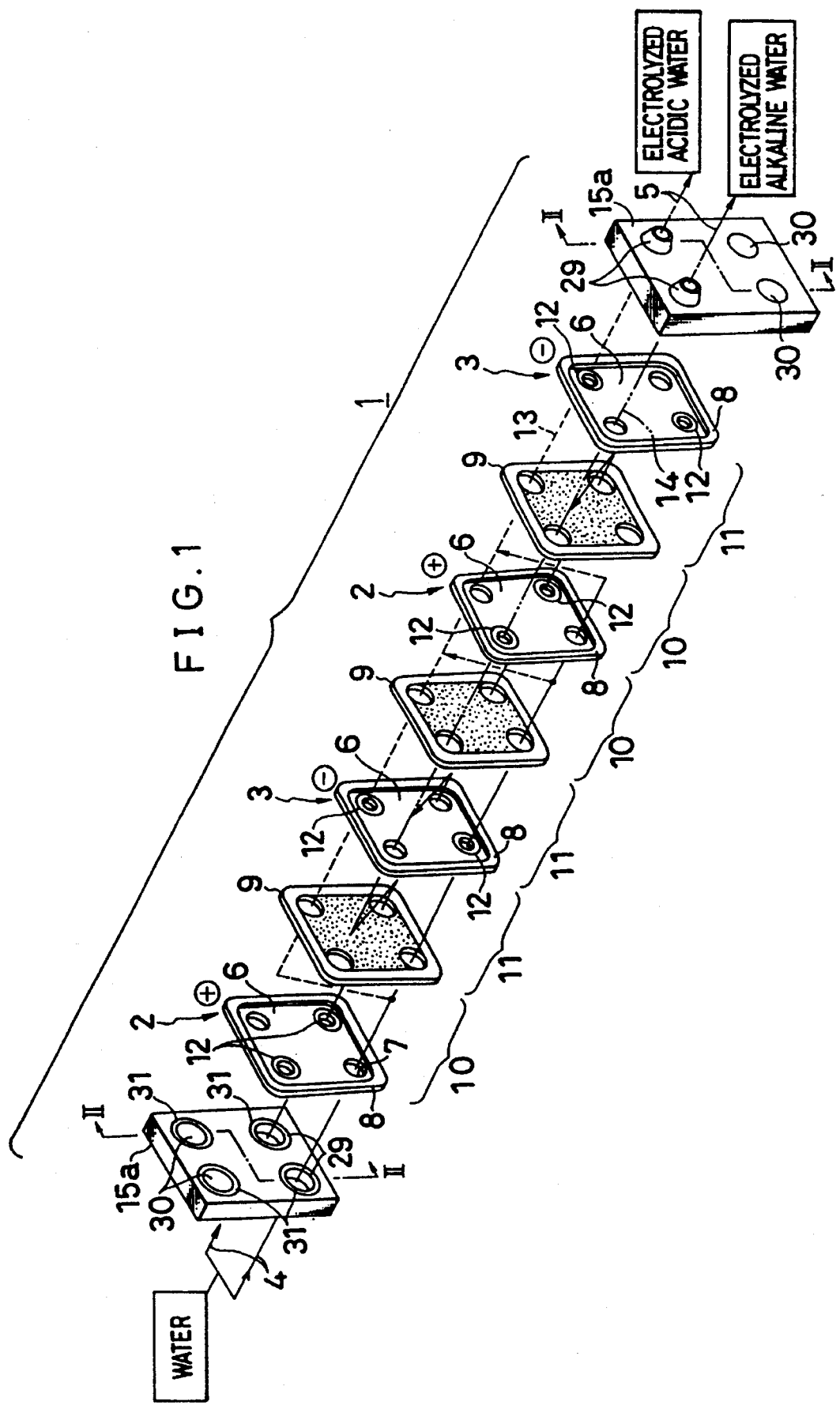
FIG. 1 is an exploded perspective view showing a preferred embodiment of apparatus for producing electrolyzed water according to the present invention.

Referring first to FIG. 1, an apparatus for producing electrolyzed water according to this embodiment includes positive electrodes 2 (each of which will be also referred to as an anode plate hereinafter), negative electrode plates 3 (each of which will be also referred to as a cathode plate hereinafter), and permeable membranes 9 each provided between both the electrode plates 2 and 3. Further, frames 15a, 15a are mounted on opposite sides of a group of these electrode plates.

Electrode Plate 6

Figure 3A:
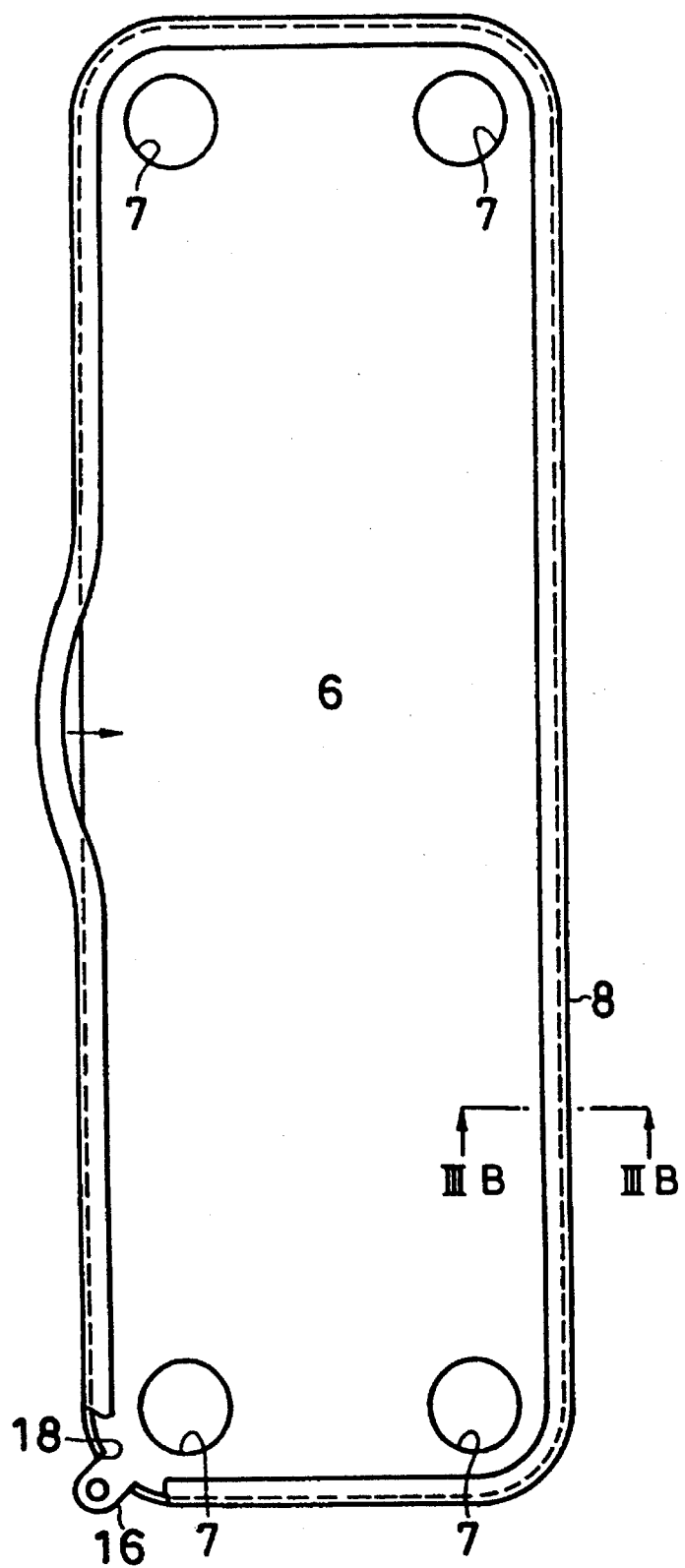
FIG. 3A is a front view of an electrode plate in the apparatus for producing electrolyzed water shown in FIG. 1 with a sealing packing mounted thereto.

An electrode plate 6 forming each of the anode and cathode plates 2 and 3 is made, for example, by coating (which may be performed by calcination) a surface of a titanium plate with a thin film of platinum or an alloy of platinum and iridium. As shown in FIG. 3, the electrode plate 6 has through-holes 8 opened in four corners thereof. The electrode plate 6 may be commonly used as either of the anode and cathode plates 2 and 3, and the through-holes 7 are opened in symmetry, so that there is no difference between the top and the bottom even in the same pole. The electrode plate 6 may be also used as a partition plate 6' for any of heat exchangers H, C and R, as will be described hereinafter.

In FIG. 3, reference numeral 16 is a flange for connecting a terminal from a power source 17. When the electrode plate 6 is used as the anode plate 2, a positive pole terminal is connected, and when the electrode plate 6 is used as the cathode plate 3, a negative pole terminal is connected. It should be noted that as long as through-holes 7 opened in the four corners are symmetrical, in putting the electrode plates 6 together as described hereinafter, the flange 16 may be disposed in any of upper and lower locations. Particularly, when the terminal or the like interferes due to a narrow space for connection of the flange 16 with the terminal of the power source 17, it is preferable that the flanges 16 of the electrode plates to be put together are positioned alternately in upper and lower locations.

When the electrode plate 6 is used as the partition plate 6' for each of the heat exchangers H, C and R, the flange 16 is not required, but if it is taken into consideration to commonly use the electrode plates 6 and the partition plates 6' and to replace the electrode plates 6 of the apparatus for producing electrolyzed water and the partition plates 6' of the heat exchanger H, C, R by each other after being used for a long period, it is desirable that the flange 16 is left as it is, without connection of the power source thereto.

Sealing Packing (Sealing Member)

As shown in FIG. 3, a sealing packing (i.e., a sealing member) 8 is fitted around a peripheral edge of the electrode plate 6 and formed from a rubber such as ethylenepropylene rubber (EPDM). A through-hole 18 is opened in the sealing packing 8 for permitting a passage of the flange of the electrode plate 6. To fit the sealing packings 8 to the electrode plates 6, they can be assembled only by inserting each of the flanges 16 of the electrode plates through the through-hole 18 in the sealing packing 8 and then, successively fitting the sealing packings 8 around the peripheral edges of the electrode plates 6.

Figure 2:
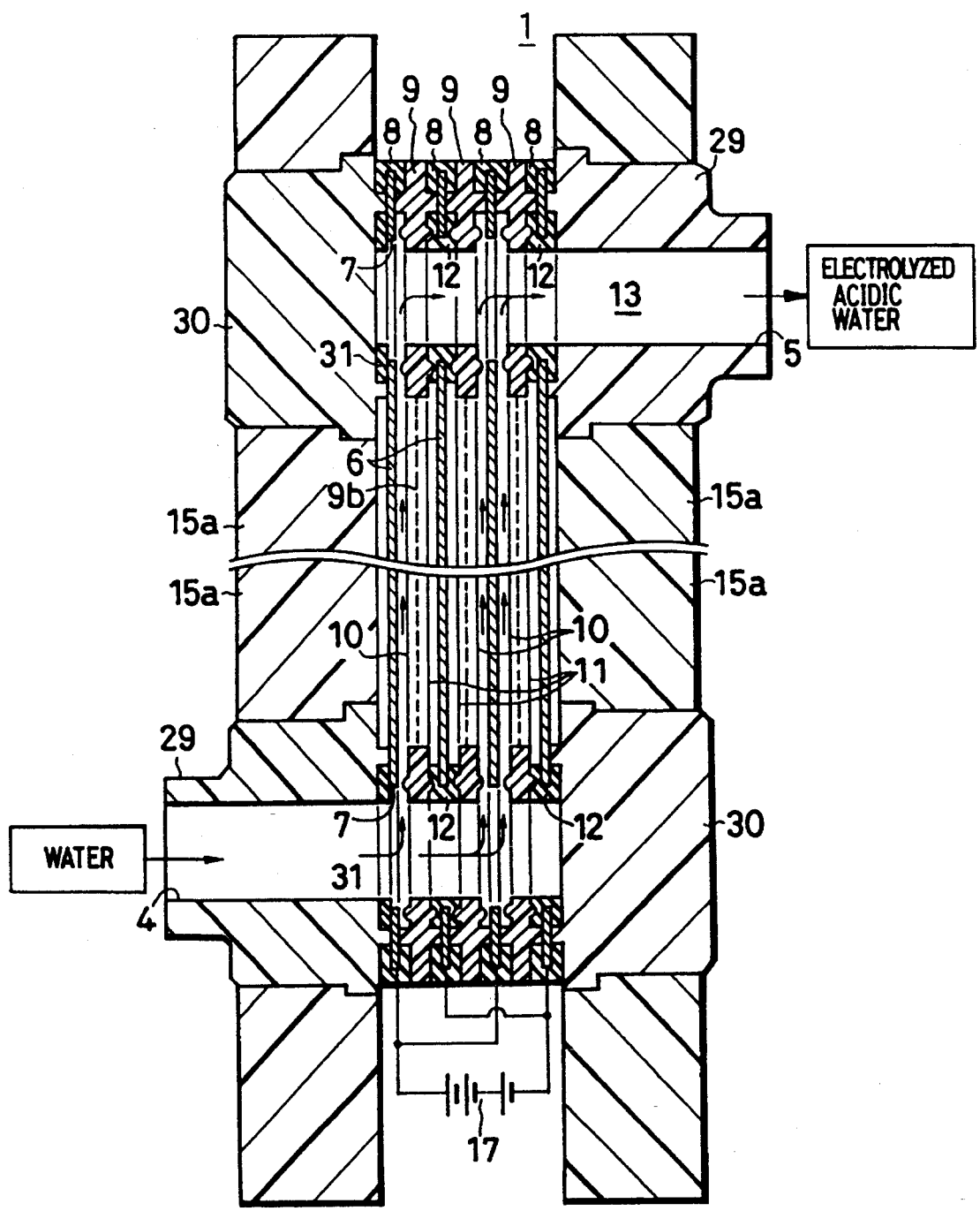
FIG. 2 is a sectional view of an essential portion of the apparatus for producing electrolyzed water shown in FIG. 1 taken along a line II—II shown in FIG. 1.

When several electrode plates 6 and several permeable membrane plates 9 are put together (in the embodiment shown in FIGS. 1 and 2, four electrode plates and three membrane plates are put together), as shown in FIG. 2, opposite surfaces of each of the sealing packings 8 are brought into press contact with the peripheral edge of the membrane plate 9 to insure a sealability. When parts, i.e., the frames 15a, the electrode plates 2 and 3, the sealing packings 8, the membrane plates 9, and the sealing plugs 12, 20, and 36, have been assembled, the sealing packings 8 form a peripheral wall of the electrolytic cell 1 by cooperation with the membrane plates 9. The same is true of embodiments (shown in FIGS. 8 to 20, 22 and 23) other than the embodiment shown in FIGS. 1 and 2.

Figure 3B:
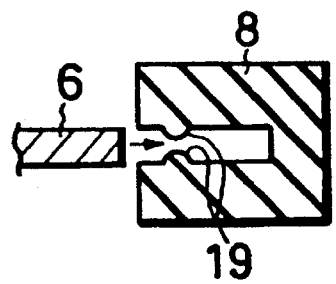
FIG. 3B is a sectional view taken along a line IIIB—IIIB shown in FIG. 3A.

It should be noted that an annular ridge 19 is formed in an inner surface of the sealing packing 8 around the entire periphery thereof for enhancing the sealability to the electrode plate 6, when the sealing packing 8 has been fitted, as shown in FIG. 3B.

Sealing plug

Figure 7A:
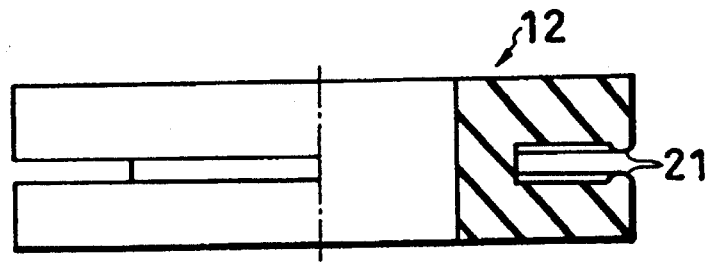
FIG. 7A is a partially sectional view of a through-packing fitted in a through-hole in the electrode plate shown in FIG. 3.
Figure 7B:
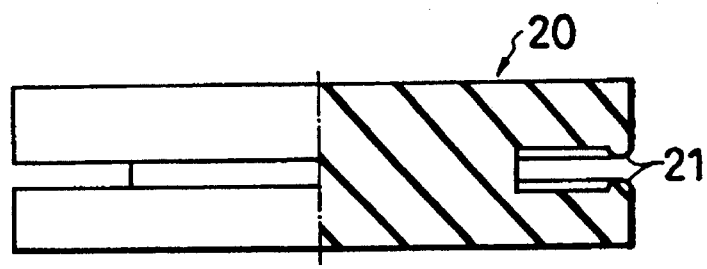
FIG. 7B is a partially sectional view of a plug packing likewise fitted in the through-hole in the electrode plate.
Figure 7C:
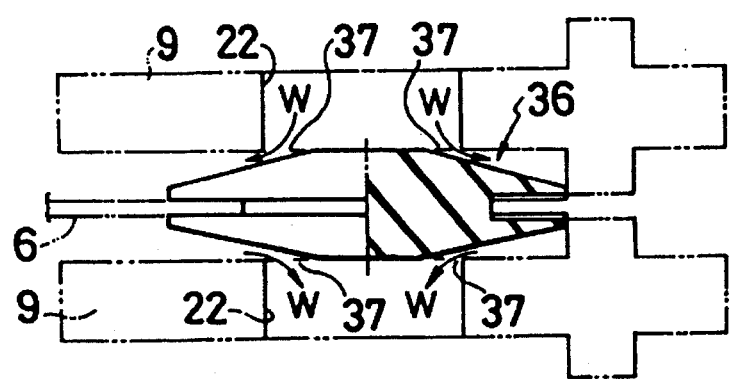
FIG. 7C is a partially sectional view of a turn packing likewise fitted in the through-hole in the electrode plate.

Any of various sealing plugs such as a through-packing 12 shown in FIG. 7A, a plug packing 20 shown in FIG. 7B and a turn packing 36 shown in FIG. 7C may be selectively mounted in the through-hole 7 opened in the electrode plate 6, if necessary. The detail of the selection of one of the through packing 12, the plug packing 20 and the turn packing 36 will be described hereinafter, and an annular ridge 21 similar to that of the sealing packing 8 is formed in an inner surface of each of the packings 12, 20 and 36 to enhance the sealability to the electrode plate 6.

The through-packing 12 permits a subject water W (i.e., a water to be electrolyzed) introduced from the inlet 4 to be passed therethrough as it is, but blocks a flow of the subject water W from an anode chamber 10 and a cathode chamber 11 into the through-hole 7 in the electrode plate 6. To the contrary, the plug packing 20 blocks both of a passage of a subject water W introduced from the inlet 4 to be passed therethrough and a flow of the subject water W from an anode chamber 10 and a cathode chamber 11 into the through-hole 7 in the electrode plate 6 with the through packing 12 mounted therein.

On the other hand, the turn packing 36 blocks a passage of a subject water W introduced from the inlet 4, but permits a turning of the subject water W from one of surfaces of the electrode plate 6 with such turn packing 36 mounted thereto to the other surface. Thus, as shown in FIG. 7C, the subject water W is permitted to flow from a through-hole 22 opened in the membrane plate 9 through a clearance 37 formed between the membrane plate 9 and the turn packing 36 and then flow down along the one surface of the electrode plate 6. Concurrently, the subject water W flowing down along the other surface flows through the clearance 37 formed between the membrane plate 9 and the turn packing 36 toward a downstream.

If the through-packing 12 or the plug packing 20 is mounted in the through-hole 7, as shown in FIG. 2, the annular ridge 23 (see FIG. 4) formed around the periphery of the through-hole 22 in the membrane plate 9 is brought into press contact with the through-packing 12 or the plug packing 20, thereby insuring a sealability between the anode chamber 10 shown in FIG. 1 and a flow passage 14 of electrolyzed alkaline water and a sealability between the cathode chamber 11 and a flow path 13 of electrolyzed acidic water. The same is true of the embodiments (shown in FIGS. 8 to 20, 22 and 23) other than the embodiment shown in FIGS. 1 and 2.

Membrane Plate

Figures 4A, 4B:
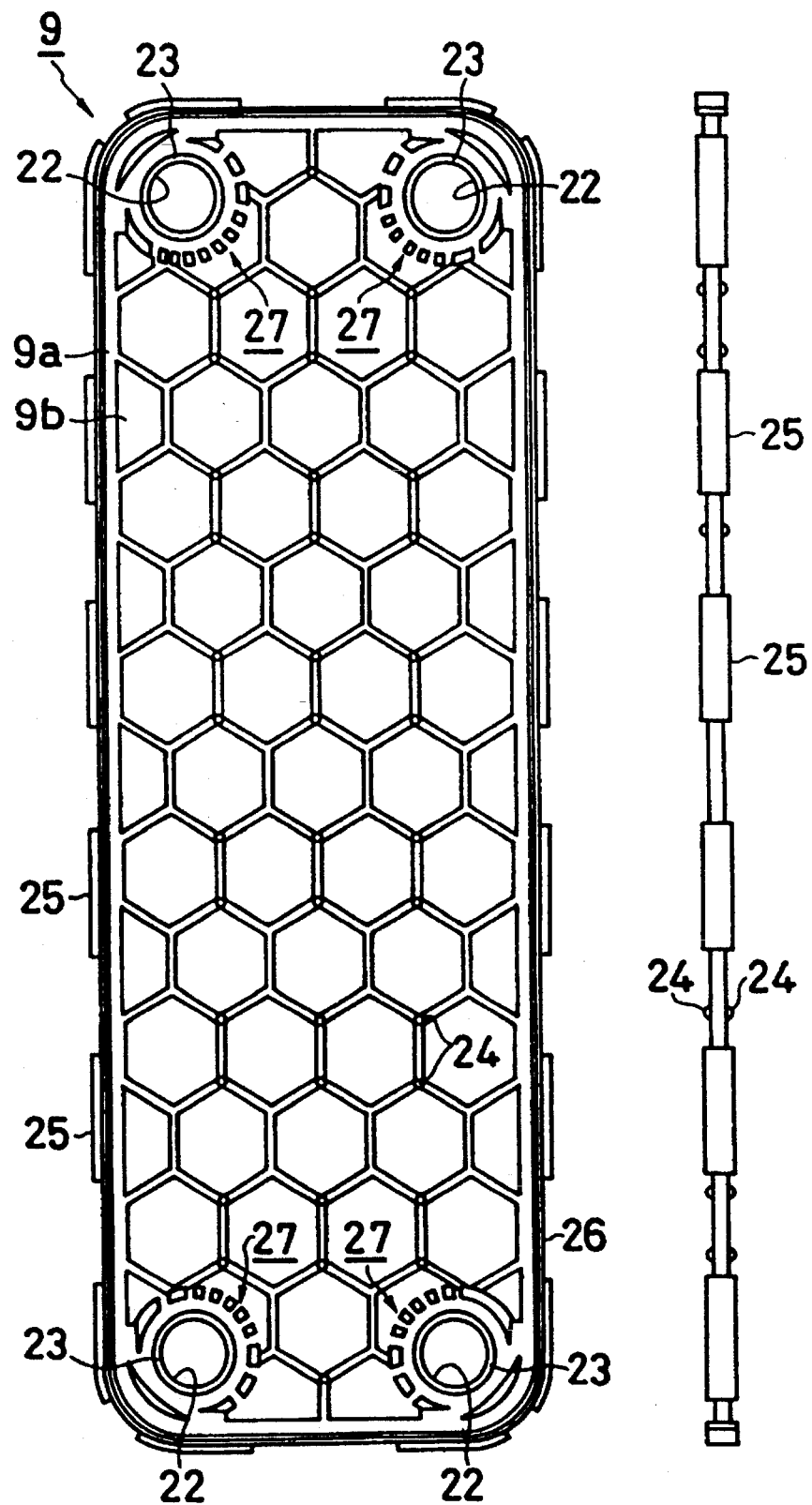
FIG. 4A is a front view of a membrane plate in the apparatus for electrolyzed water shown in FIG. 1.
FIG. 4B is a side view of the membrane plate in the apparatus for electrolyzed water shown in FIG. 1.

The membrane plate 9 shown in FIG. 4 is comprised of a frame 9a made of, for example, a synthetic resin such as a polyvinyl chloride, and a membrane 9b embedded simultaneously in injection molding of the frame 9a. The membrane 9b may be formed from, for example, an polyethylene-based ion-exchange resin. The frame 9a is comprised of regular hexagonal lattices continuously connected to one another in consideration of a permeability to the subject water W and a rigidity of the frame itself, with projections 24 being partially formed. With the membrane plate 9 and the electrode plate 6 laminated one on another, the projections 24 are put into abutment against the electrode plate 6 to insure a clearance between the electrode plate 6 and the membrane plate 9 and in addition, to cause a turbulent flow to exhibit even an agitating function. The projections 24 also have an effect of enhancing the rigidity of the frame 9a.

Further, guides 25 may be formed partially or continuously around a periphery of the frame 9a and serve a function to guide the sealing packing 8 fitted around the peripheral edge of the electrode plate 6. Thus, in putting the electrode plate 6 and the membrane plate 9 together, the electrode plate 6 need only be laid on the membrane plate 9 in such a manner that the guides 25 formed on the membrane plate 9 are positioned. At this time, an annular rib 26 continuously formed inside the guides 25 is pressed against sealing packing 8 on the electrode plate 6, thereby enhancing the sealability between the electrode plate 6 and the membrane plate 9.

Through-holes 22 are opened in four corners of the membrane plate 9 to align with the through-holes 7, and further, an annular rib 23 is formed around each of the through-holes 22. When the electrode plate 6 and the membrane plate 9 have been laminated one on another, as described above, the annular rib 23 is pressed against the through-packing 12 or the plug packing 20 mounted to the electrode plate 6, thereby insuring a sealability between the anode chamber 10 as well as the cathode chamber 11 formed between the electrode plate 6 and the membrane plate 9 and the flow passage 13 as well as the flow passage 14 for the subject water W.

It should be appreciated that a radial nozzle portion 27 is formed around a periphery of each of the through-holes 22 opened in the membrane plate 9 for radially guiding the subject water W discharged from the through-hole 22. This radial nozzle portion 27 functions to guide the subject water W as uniformly as possible over the entire electrode plate 6, when the subject water W is discharged into the anode and cathode chambers 10 and 11 formed between the electrode plate 6 and the membrane plate 9. The radial nozzle portion 27 also functions to eliminate an air pocket liable to be accumulated in an upper portion of each of the anode and cathode chambers 10 and 11. In this sense, the specified structure of the radial nozzle portion 27 is particularly not limited to only that in the illustrated embodiment and can be modified properly, if necessary.

Frame, Liquid Conduit Adapter and Plug

Figure 5A:
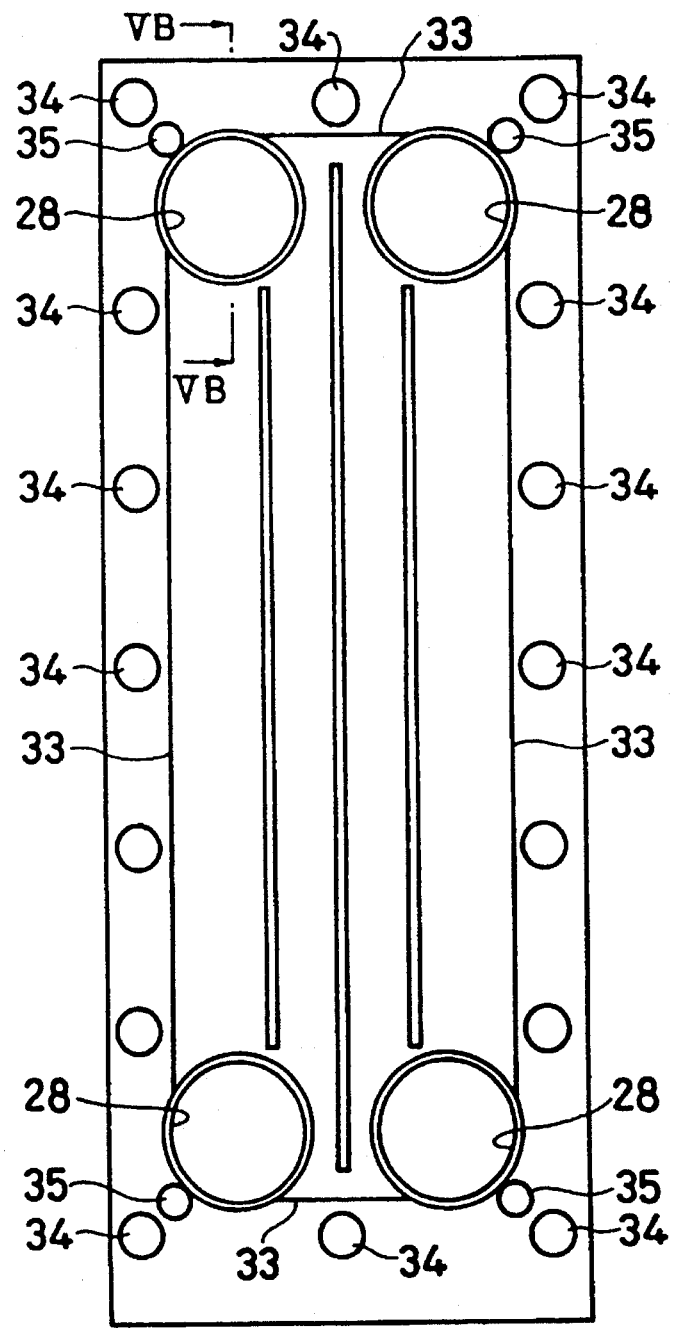
FIG. 5A is a front view of a frame in the apparatus for producing electrolyzed water shown in FIG. 1.
Figure 5B:
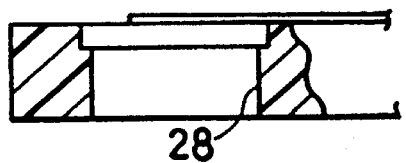
FIG. 5B is a sectional view taken along a line VB—VB shown in FIG. 5A.

In the apparatus for producing electrolyzed water of this embodiment, when the electrode plates 6 and the membrane plates 9 are laminated (i.e.,put together), the frame 15a is mounted on one surface of the resulting assembly, as shown in FIGS. 1, 2 and 5. The material and shape for the frame 15a are particularly not limited, if the frame 15a is of a structure capable of insuring a rigidity.

The frame 15a has through-holes 28 opened in four corners thereof to align with the through-holes 7 and 22 which are opened in the electrode plate 6 and the membrane plate 9, respectively. A liquid conduit adapter 29 shown in FIG. 6A or a liquid conduit plug 30 shown in FIG. 6B may be mounted selectively, as required, in each of the through-holes 28. The liquid conduit adapter 29 forms the inlet 4 or the outlet 5 for the subject water W. The liquid conduit plugs 30 may be mounted in the other through-holes 28 to close the flow passage.

The frame 15a in the present embodiment is formed vertically and laterally symmetrically and moreover, any of the liquid conduit adapter 29 and the liquid conduit plug 30 can be selectively mounted in the through-hole 28 and hence, the liquid conduit adapter 29 and the liquid conduit plug 30 can be freely selected in accordance with conditions such as the specification, the application, the mounting place and the like of an apparatus for producing electrolyzed water with a heat exchanger constructed by various combinations of heat exchangers H, C and R which will be described hereinafter with the apparatus for producing electrolyzed water.

Figure 7D:
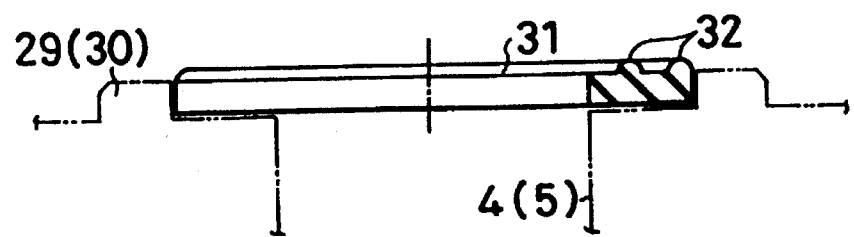
FIG. 7D is a partially sectional view of a liquid conduit packing used in the liquid conduit adapter or the liquid conduit plug shown in FIG. 6.

A liquid conduit packing 31 as shown in FIG. 7D is mounted to each of the liquid conduit adapter 29 and the liquid conduit plug 30 to enhance the sealability between the frame 15a and the electrode plate 6 located adjacent the frame 15a. Particularly, if an annular projection 32 is formed on the liquid conduit packing 31, as shown in FIG. 7D, it is brought into close contact with the periphery of the through-hole 7 in the electrode plate 6, thereby enhancing the sealability between the frame 15a and the through-hole 7 in the electrode plate 6.

A rib 33 is continuously formed on the frame 15a to abut against the seal packing 8 mounted to the electrode plate 6. This also insures a sealability between the entire electrode plate and the frame.

Through-holes 34 are provided as bolt-insertion holes in a periphery of the frame 15a and thus, the apparatus for producing electrolyzed water of this embodiment is assembled by putting the electrode plates 6 and the membrane plates 9 together, disposing the frames 15a on opposite sides of the resulting assembly of these electrode plates, and then inserting bolts (not shown) through these bolt-insertion holes 34 to tighten them. Alternatively, the frames 15a may be coupled to the assembly of the electrode plates by other fastening means other than the bolts, such as a clamp.

Reference numeral 35 shows a through-hole used for connecting the terminal of the power source 17 collectively to the flanges 16 formed on the electrode plates 6. For example, the flanges forming the anodes 2 may be disposed at the same position, and the flanges forming the cathodes 3 may be disposed at a different position. One of four pairs of the through-holes 35, 35 defined in both the frames may be used for the anodes, and any of the other pairs may be used for the cathodes. If the through-holes 35 are used so, it is possible to simplify the connection of the terminal to the apparatus for producing electrolyzed water.

It should be noted that in the present invention, the above-described frame 15a is necessarily not required, and for example, the electrolytic cell 1 constructed by lamination of the electrode plates 6 and the membrane plates 9 may be fixed directly to a desired place (a wall or another device).

The operation of this embodiment will be described below.

To assemble the apparatus for producing electrolyzed water of this embodiment, the sealing packing 8 is first mounted to the peripheral edge of each of the electrode plates 6, as shown in FIG. 3. Then, the through-packing 12 shown in FIG. 7A, the plug packing 20 shown in FIG. 7B or the turn packing 36 shown in FIG. 7C, as required, is mounted in each of the through-holes. The electrode plates 6 assembled in this manner and the membrane plates 9 are laminated (put together) alternately. In this case, each component have a general purpose property, i.e., all of the electrode plates 6 are of the same members, all of the sealing packings 8 are of the same members and can be fitted to any of the electrode plates 6, all of the membrane plates 9 are of the same members. Therefore, the number of plates laminated can be selected freely in accordance with the specification of the apparatus for producing electrolyzed water. In the embodiment shown in FIGS. 1 and 2, the four electrode plates and the three membrane plates are laminated.

Finally, the frame 15a, with the liquid conduit adapter 29 or the liquid conduit plug 30, as desired, mounted in each through-hole 28 therein, is disposed on one side of the laminated assembly of the electrode plates 6 and the membrane plates 9, and the similar frame 15a is also disposed on the other side, or a terminal plate 15b which will be described is disposed, and bolts are inserted through the bolt-insertion holes 34 and tightened.

In this way, the assembling operation for the apparatus for producing electrolyzed water of this embodiment is extremely easy, and the number of the components is small, leading to a considerably large advantage in cost.

As shown in FIG. 2, in the apparatus for producing electrolyzed water of this embodiment, the electrode plates 6 and the membrane plates 9 located between the frames 15a, 15a constitute the electrolytic cell 1 itself, wherein a space between the anode 2 and the adjacent membrane plate 9 serves as the anode chamber 10, while a space between the cathode 3 and the adjacent membrane plate 9 serves as the cathode chamber 11.

Moreover, the anode and cathode chambers 10 and 11 are isolated only by taking account of the mounting positions for the through-packing 12 and the plug packing 20 into the through-hole 7 in the electrode plate 6, as shown in FIG. 1.

Thus, the subject water W introduced through the liquid conduit adapter 29 (which forms one inlet 4 for the subject water W) mounted to one of the frames 15a flows into the anode chamber 10 formed between the electrode plate, free from the through-packing 12, namely the anode plate 2 and the membrane plate 9. During this time, the subject water W introduced through this inlet 4 cannot flow into the cathode chamber 11 (but the subject water introduced through the other inlet flows only into the cathode chamber), because the through-packing 12 is mounted in the through-hole 7 in this cathode plate 3.

In the anode chamber 10 divided in this manner, a reaction represented by a following reaction formula:

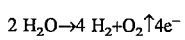

$$2\ H_2O \rightarrow 4\ H_2 + O_2 \uparrow 4e^-$$

occurs, so that the concentration of hydrogen ion is increased to produce electrolyzed acidic water. Cations such as calcium, sodium, magnesium and potassium ions contained (or intentionally added) in city water are permitted to penetrate the membrane 9b, attracted toward the cathode and collected into the cathode chamber 11. On the other hand, in the anode chamber 11, a reaction represented by a following reaction formula:

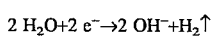

$$2\ H_2O + 2\ e^- \rightarrow 2\ OH^- + H_2 \uparrow$$

occurs, so that the concentration of hydroxide ion is increased to produce electrolyzed alkaline water. Anions such as chlorine ion contained in the city water is permitted to penetrate the membrane, attracted toward the anode and collected into the anode chamber 10.

Thus, the electrolyzed acidic water passed through the anode chamber 10 flows through the flow passage 13 and reaches the liquid conduit adapter 29 (which forms the outlet 5 for the electrolyzed acidic water) mounted to the frame 15a. Even in this case, the electrolyzed alkaline water from the anode chamber 11 cannot flow into the flow passage 13 which is in communication with the outlet 5 for the electrolyzed acidic water (the electrolyzed alkaline water is passed into the other outlet).

In this manner, the apparatus for producing electrolyzed water of this embodiment is designed to perform an electrolyzing function in a construction comprising necessary and minimal components in varied combinations and therefore, it is possible not only to provide a reduction in cost by reducing the number of components and using the general-purpose components, but also to modify the specification of the apparatus.

The apparatus for producing electrolyzed water shown in FIGS. 1 and 2 is suitable, for example, when it is desired to be used as a relatively large flow rate type, but following applications are possible, for example, when the apparatus for producing electrolyzed water is desired to be used as a relatively small flow rate type (see FIGS. 8 and 9), as a membraneless type (see FIGS. 10 to 13), or as a type with membraneless electrolyzing chambers provided in part (see FIGS. 14 to 18).

Application utilizing a difference in flow rate

Figure 8:
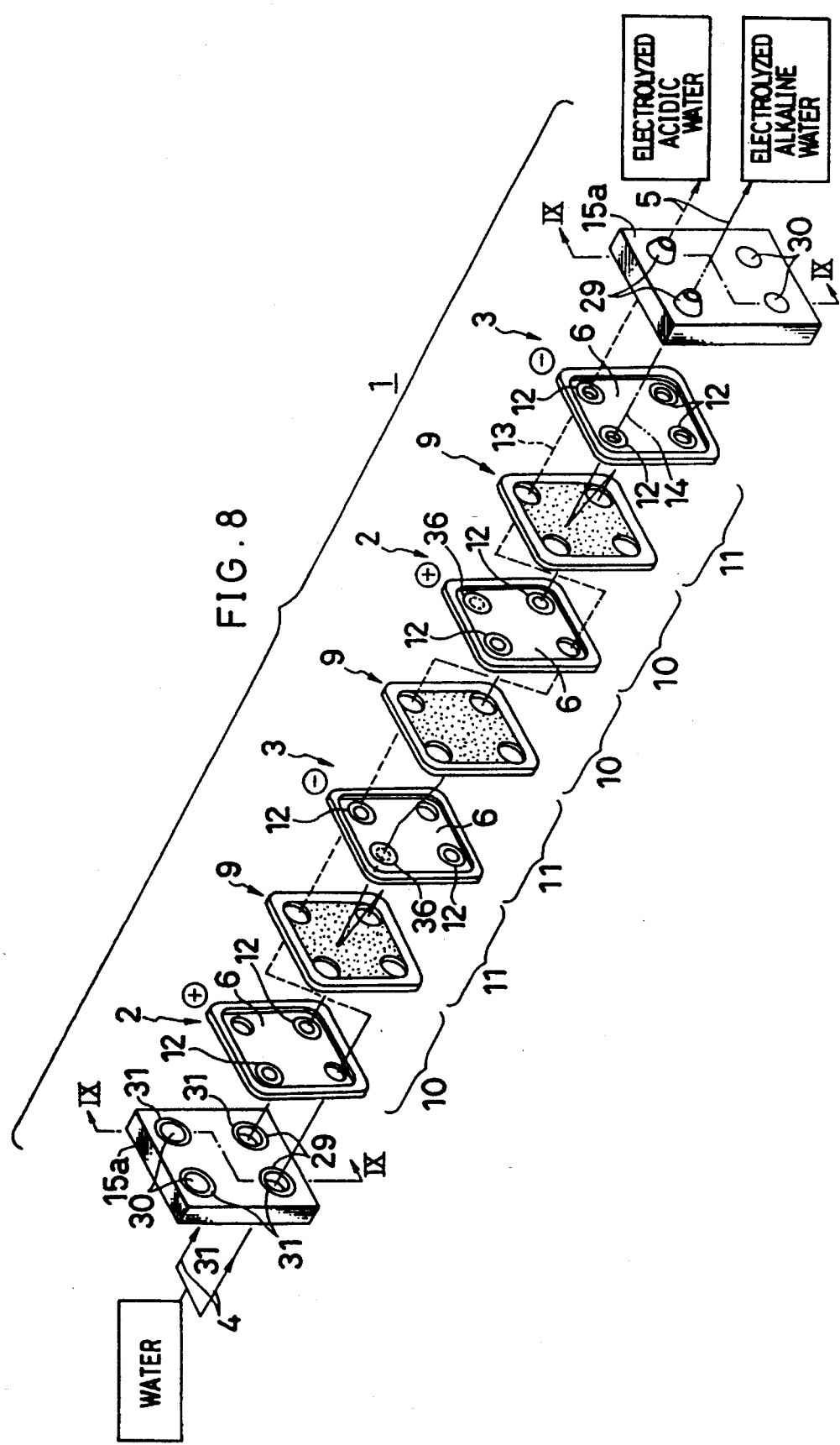
FIG. 8 is an exploded perspective view showing a modified embodiment applied as a relatively small flow rate type apparatus for producing electrolyzed water.
Figure 9:
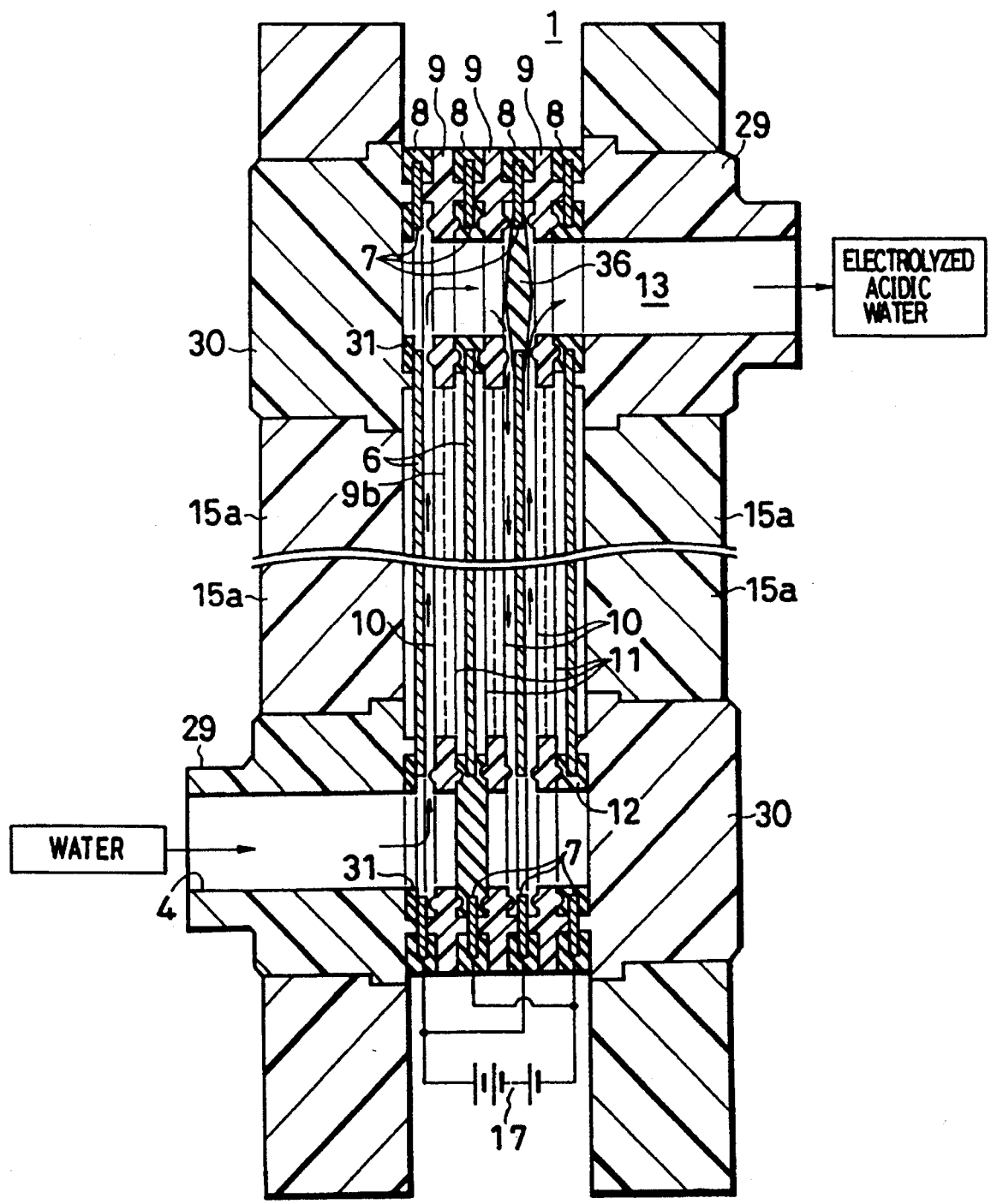
FIG. 9 is a sectional view taken along a line IX—IX shown in FIG. 8.

FIG. 8 is an exploded perspective view of an embodiment of the present invention applied as an apparatus for producing electrolyzed water of a relatively small flow rate type, whereas FIG. 1 is an exploded perspective view of the apparatus for producing electrolyzed water used in the form of a relatively large flow rate type, wherein like members or components are designated by like reference characters.

In the embodiment shown in FIG. 8, the packings 12, 20 and 36 mounted in the through-holes in the electrode plates 6 are modified from those in the embodiment shown in FIG. 1.

The embodiment shown in FIG. 1 is preferred to be used in the form of the relatively large flow rate type, because even if the flow rate of the subject water is large, the subject water introduced through the inlet 4 into the electrolytic cell is successively diverted to pass each anode chamber 10 and each cathode chamber 11 (in a so-called "parallel" flow passage configuration). With regard to the number of components, the apparatus shown in FIG. 1 is of a construction sufficed mainly by only the through-packings 12 without use of the plug packings 20 and the turn packings 36.

To the contrary, in the embodiment shown in FIG. 8, the configurations of the anode plates 2, the membrane plates 9 and the cathode plates 3 are the same as those in the embodiment shown in FIG. 1, but the configurations of the packings 12, 20 and 36 mounted in the through-holes 7 in the anode plates 2 and the cathode plates 3 are different from those in the embodiment shown in FIG. 1. More specifically, the embodiment shown in FIG. 8 is of a flow passage configuration (a so-called "serial" flow passage configuration) in which the subject water W introduced through the inlet 4 into the electrolytic cell 1 successively flows in a zigzag way from the anode chamber 10 adjacent the inlet 4 to the outlet 5, rather than being successively diverted to pass each anode chamber 10 and each cathode chamber 11. In the embodiment shown in FIG. 8, either the electrolyzed acidic water and the electrolyzed alkaline water pass the electrolyzing chambers 10 and 11 three times in total, respectively, and the flow resistance is large. Therefore, it is preferable that the apparatus for producing electrolyzed water shown in FIG. 8 is used as the relatively small flow rate type. However, even if the area of the electrode plate is small, if the number of the electrode plates 6 and the membrane plates 9 laminated together is increased, it is possible to insure a required pH value, leading to an advantage that the size of the electrolytic cell can be reduced.

Application to Membraneless Apparatus for producing electrolyzed water

In the apparatus for producing electrolyzed water according to the present invention, the membrane plate 9 is necessarily not required. More specifically, the membrane plates 9 may be mounted, when it is desired to separate and remove the electrolyzed acidic water and the electrolyzed alkaline water. For example, if it is desired to produce electrolyzed water comprised of a mixture of these electrolyzed acidic water and electrolyzed alkaline water, then the membrane plates 9 may be omitted.

A some amount of chlorine ion is contained, for example in natural water, and a chlorine agent is incorporated as a disinfecting or sterilizing agent in drink water. A subject water containing chlorine in this manner is a liquid having not only a disinfecting or sterilizing ability, but also a corrosive property, and hence, it is necessary to subject a piping system to a corrosion-preventing treatment. However, if such a subject water is electrolyzed in a membraneless manner, hydrogen ion is converted into hydrogen gas and released from the liquid and hence, the resulting electrolyzed water is a weakly alkaline liquid containing chlorine. It is known that chlorine has a strong corrosive property in the acidic water, but in alkaline water, the corrosive property is inhibited, and only a sterilizing effect is left. Therefore, if city water containing chlorine or the like is merely electrolyzed in a membraneless manner to produce weakly electrolyzed alkaline water, this weakly electrolyzed alkaline water is useful, for example, as a sterilizing liquid having a less corrosive property.

Particularly, a weakly alkaline aqueous solution of hypochlorous acid has a larger content of hypochlorite ion $OCl^{-1}$ than hypochlorous acid $HOCl$ and hence, is relatively inferior in sterilizing effect, but advantageous in respect of the corrosive property to a pumping system and a piping system for a sterilizing water. Therefore, if the sterilizing effect and the corrosion-preventing effect are desired to be reconciled with each other, a weakly alkaline aqueous solution of hypochlorous acid having a pH value in a range of 7 to 8 is larger in utility value than a weakly alkaline aqueous solution of hypochlorous acid having a pH value in a range of 3 to 7.

Figure 10:
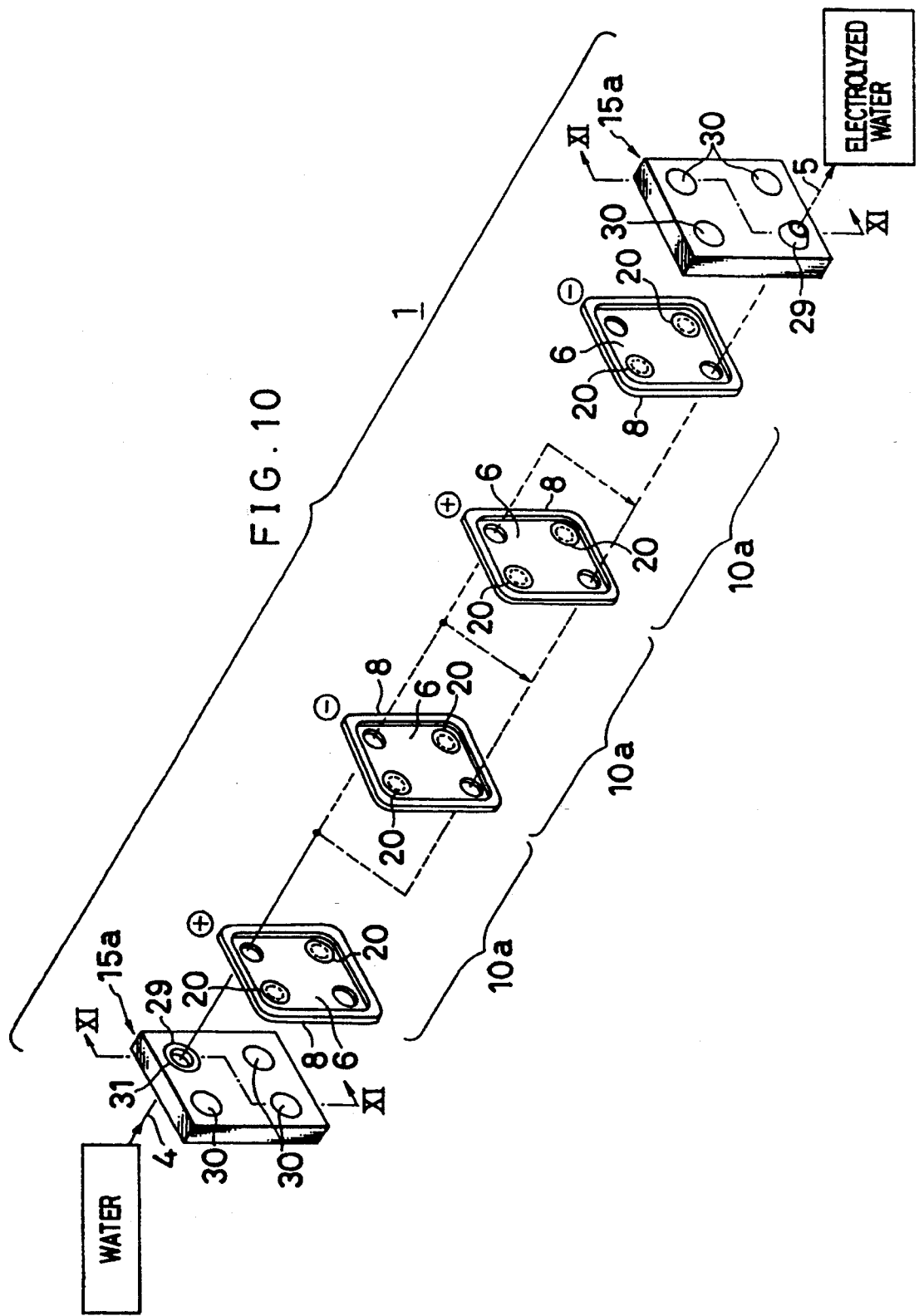
FIG. 10 is an exploded perspective view showing another embodiment of the present invention applied as a membraneless apparatus for producing electrolyzed water.
Figure 11:
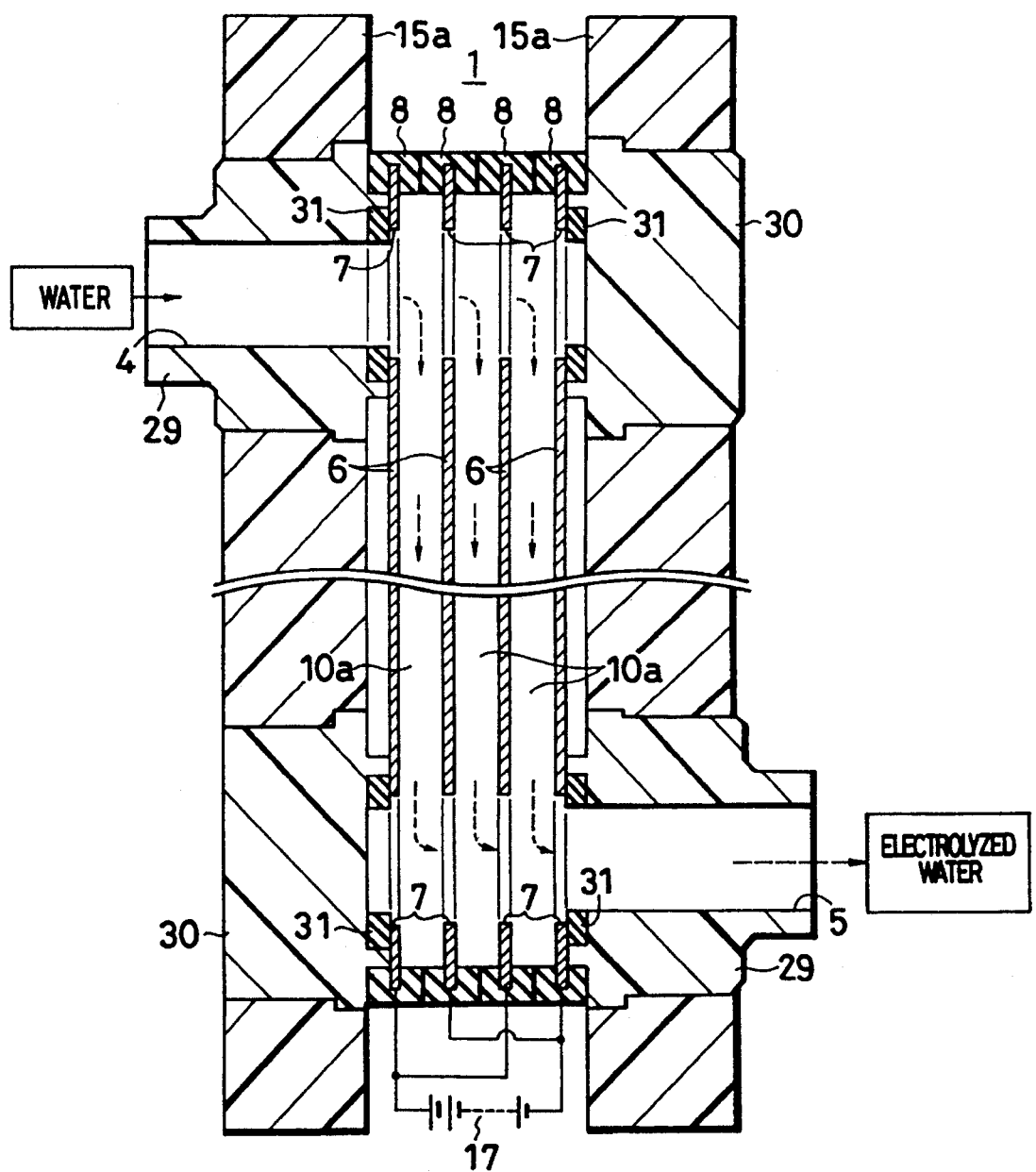
FIG. 11 is a sectional view taken along a line XI—XI shown in FIG. 10.
Figure 13:
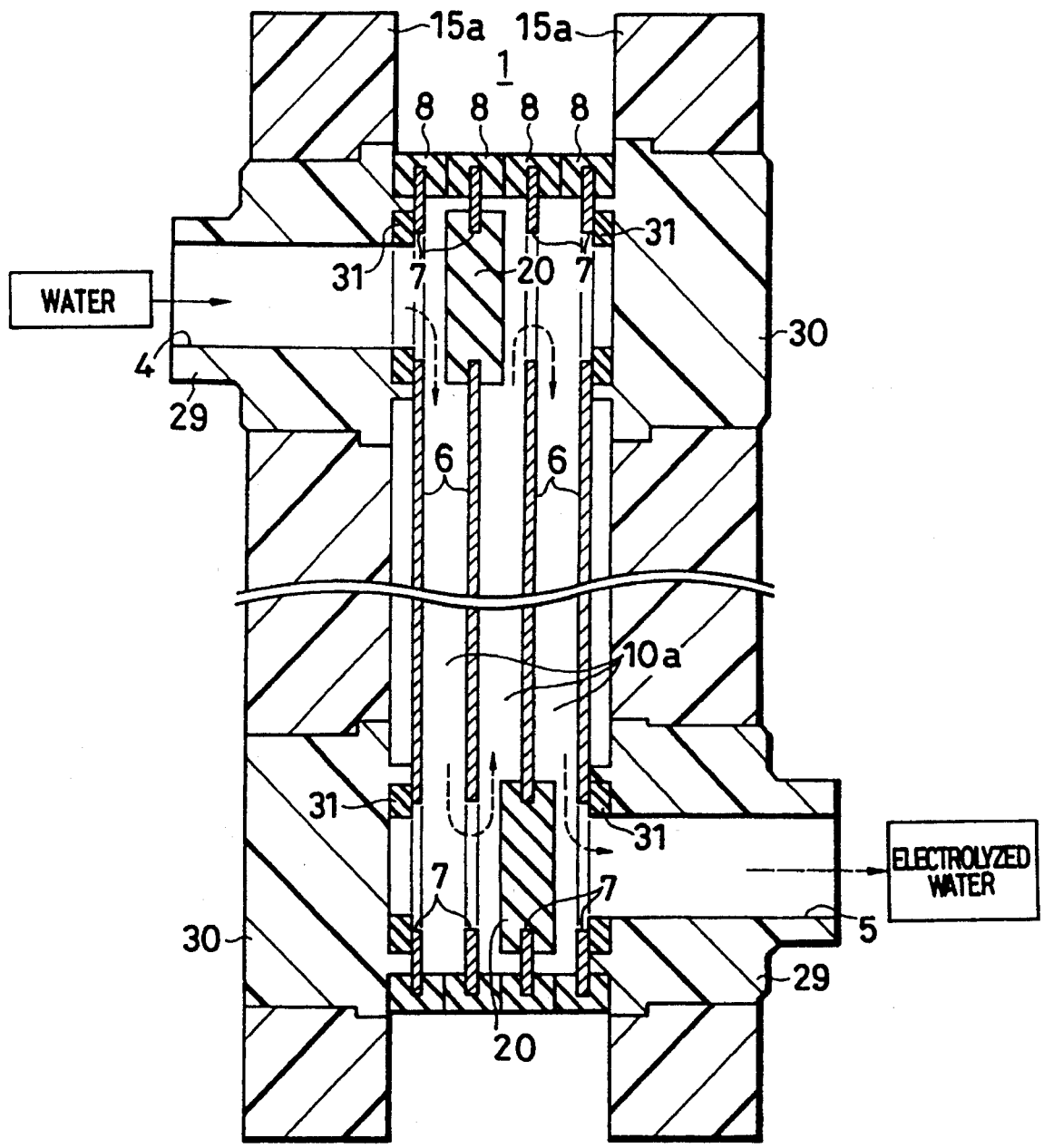
FIG. 13 is a sectional view taken along a line XIII—XIII shown in FIG. 12.
Figure 14:
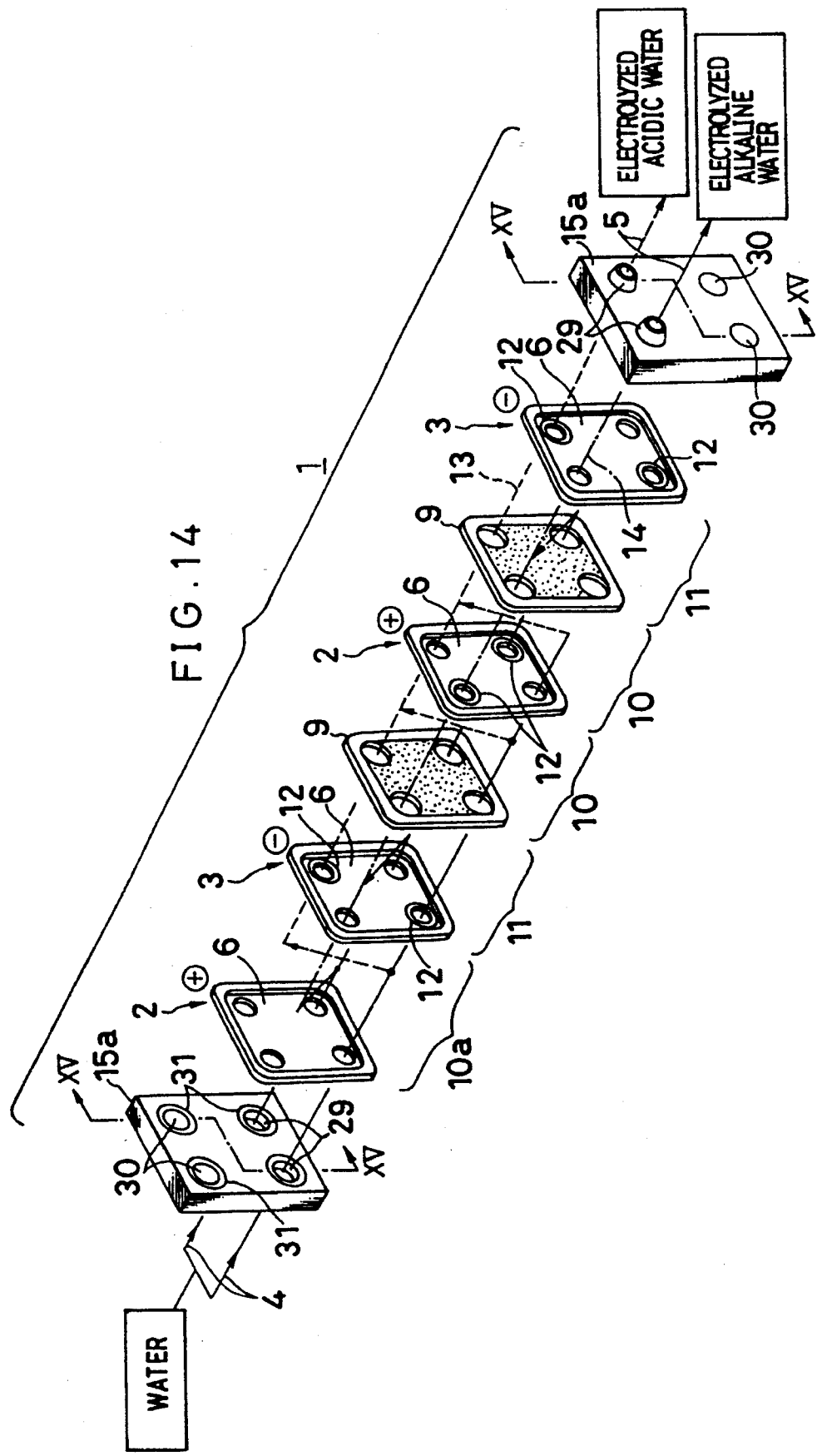
FIG. 14 is an exploded perspective view showing a still further embodiment with a membrane electrolyzing chamber included in part according to the present invention.

From such a viewpoint, in an apparatus for producing electrolyzed water shown in FIGS. 13 and 14, an electrolytic cell 1 is constructed by alternately laminating the anode plates 2 and the cathode plates 3 with the membrane plates 9 omitted. The plug packings 20 are mounted in those through-holes 7 in the electrode plates 2 and 3 which form flow passage for the subject water as shown in FIG. 10. Thus, the subject water W introduced through the inlet 4 is electrolyzed when it passes each membraneless electrolyzing chamber 10a formed between the anode plate 2 and the cathode plate 3, so that chlorine ion $Cl^{-1}$ contained in the subject water W is converted in an area adjacent the cathode plate into chlorine gas through a reaction represented by a following reaction formula:

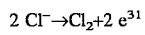
$$2\ Cl^- \rightarrow Cl_2 + 2\ e^{-1}$$

and further, this chlorine gas is dissolved into the subject water and thereby converted into hypochlorous acid through a reaction represented by a following reaction formula:

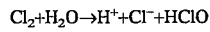
$$Cl_2 + H_2O \rightarrow H^+ + Cl^- + HClO$$

Concurrently, a reaction represented by a following reaction formula:

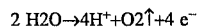
$$2\ H_2O \rightarrow 4H^+ + O_2\uparrow + 4\ e^-$$

occurs in an area adjacent the anode plate, and a reaction represented by a following reaction formula:

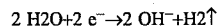
$$2\ H_2O + 2\ e^- \rightarrow 2\ OH^- + H_2\uparrow$$

occurs in an area adjacent the anode plate. The liquid within the membraneless electrolyzing chamber 10a assumes a form containing both of cations such as calcium, sodium, magnesium and potassium ions contained (or intentionally added) in the subject water, and anions such as chlorine ion.

When the anode plates 2 and the cathode plates 3 are alternately laminated with each other with the membrane plate 9 omitted, flow passages can be selected in accordance with a required flow rate. In the embodiment shown in FIGS. 10 and 11, flow passages for the subject water W introduced through the inlet 4 are defined parallel by using the plug packings 20 mounted in the through-holes 7 in the electrode plates 2 and 3. The apparatus for producing electrolyzed water employing such a flow configuration is slightly inferior in electrolyzing efficiency, as compared with the embodiment shown in FIGS. 12 and 13, but is suitable when the flow rate of the subject water W is large. Supposing that it is desired to enhance the electrolyzing efficiency at a large flow rate, the number of the electrode plates laminated may be increased.

Figure 12:
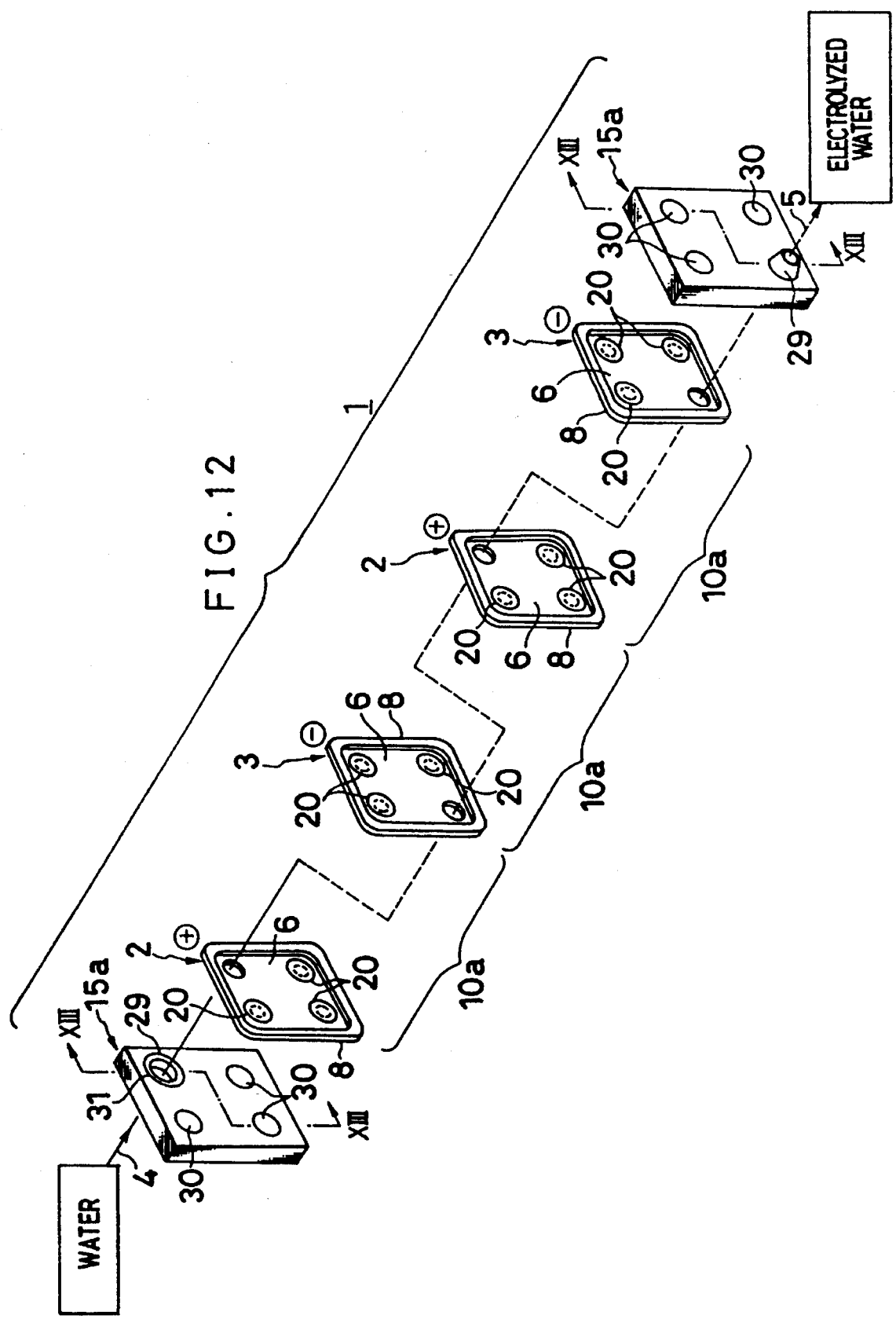
FIG. 12 is an exploded perspective view showing a further embodiment of the present invention applied as a membraneless apparatus for producing electrolyzed water.

On the contrast, in the embodiment shown in FIGS. 12 and 13, by taking account of the positions of the plug packings 20 mounted in the through-holes 7 in the electrode plate 2 and 3, the flow passages are connected in series wherein the subject water is passed three times into the membraneless electrolyzing chambers 10a. In this case, the apparatus for producing electrolyzed water can be used as a relatively small flow rate type and is excellent in electrolyzing efficiency.

In the embodiment shown in FIGS. 12 and 13, the number of lines for the subject water W introduced through the inlet 4 is one, and the liquid conduit plugs 30 are mounted in all the other through-holes 28 in the frame 5a. This embodiment is one illustrated for convenience only in order to facilitate understanding of the flowing of the subject water, and in the apparatus for producing electrolyzed water according to the present invention, the liquid conduit adapters 29 can be mounted in the other through-holes 28 to provide two or more introduction lines for the subject water W.

In addition, in the embodiment shown in FIGS. 12 and 13, it is possible to permit the subject water to flow in the reverse direction.

The weakly electrolyzed alkaline water produced from the above-described chlorine-containing city water used as the subject water W is useful as a sterilizing liquid having a less corrosive property and hence, when it is desired to enable the concentration of residual chlorine and the pH value to be controlled, constructions as shown in FIGS. 14 to 18 are preferred.

Figure 15:
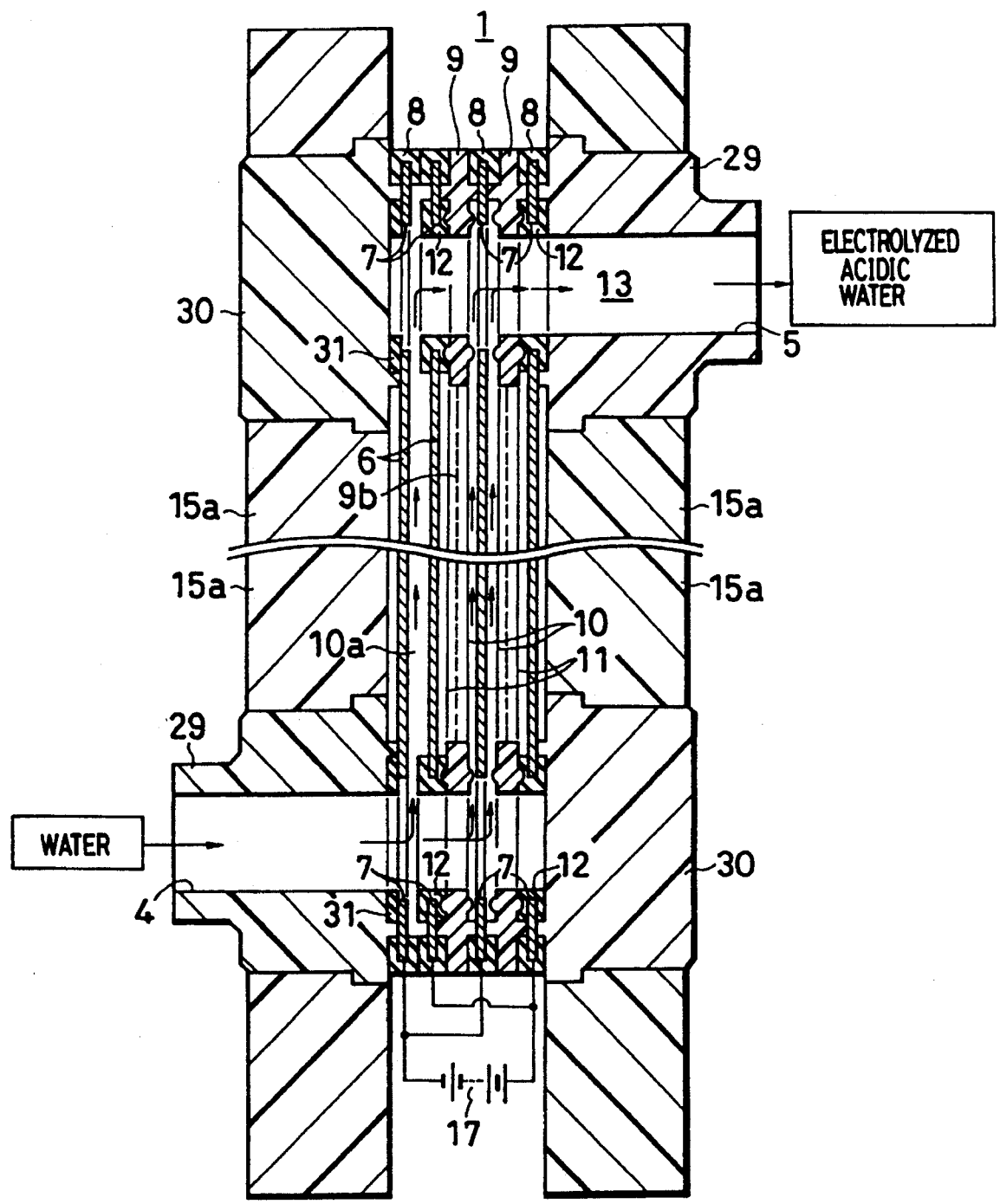
FIG. 15 is a sectional view taken along a line XV—XV shown in FIG. 14.

In an apparatus for producing electrolyzed water shown in FIGS. 14 and 15, the electrode plates 6 shown in FIG. 3 and the membrane plates 9 shown in FIG. 4 are laminated to form an anode chamber 10 between the cathode plate 2 and the membrane plate 9 and a cathode chamber 11 between the anode plate 3 and the membrane plate 9. The flow passage in each of the anode chamber 10 and the cathode chamber 11 is partitioned by selecting a packing 12 mounted in the through-hole 7 in the electrode plate, so that electrolyzed acidic water produced in the anode chamber 10 and electrolyzed alkaline water produced in the cathode chamber 11 are prevented from being mixed together after production.

A membraneless electrolyzing chamber 10a is also provided upstream of the electrolytic cell formed in the above manner and partitioned by the anode plate 2 and the cathode plate 3, and the electrolyzed water produced in the membraneless electrolyzing chamber 10a is passed into the anode chamber 10 and the cathode chamber 11. It should be noted that the membraneless electrolyzing chamber 10a may be also provided downstream or in a central portion of the electrolytic cell 1. The membraneless electrolyzing chamber 10a is single in the illustrated embodiment, but a plurality of the membraneless electrolyzing chambers 10a can be provided by laminating a plurality of electrode plates 2 and 3. Further, in the embodiment shown in FIG. 14, the electrolyzed water produced in the single membraneless electrolyzing chamber 10a is supplied into both of the anode chamber 10 and the cathode chamber 11, but two or more membraneless electrolyzing chambers 10a may be provided, i.e., a membraneless electrolyzing chamber 10a from which the electrolyzed water produced therein is supplied into the anode chamber 10, and a membraneless electrolyzing chamber 10a from which the electrolyzed water produced therein is supplied into the cathode chamber 11.

When the subject water W introduced through the inlet 4 passes the membraneless electrolyzing chamber 10a formed in the above manner, it is electrolyzed, so that chlorine ion $Cl^-$ (e.g., when the sodium chloride has been added in the subject water) contained in the subject water is converted in an area adjacent the anode plate into chlorine gas through a reaction represented by a following reaction formula:

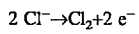

$$2\ Cl^- \rightarrow Cl_2 + 2\ e^-$$

and further, the chlorine gas is dissolved in the subject water and converted through a reaction represented by a following reaction formula:

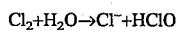

$$Cl_2 + H_2O \rightarrow Cl^- + HClO$$

Concurrently, a reaction represented by a following reaction formula:

$$2\ H_2O \rightarrow 4\ H^+ + O_2\uparrow + 4e^-$$

occurs in the area adjacent the cathode plate, and a reaction represented by a following reaction formula:

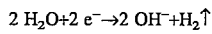

$$2\ H_2O + 2\ e^- \rightarrow 2\ OH^- + H_2\uparrow$$

occurs in the area adjacent the anode plate. Within the membraneless electrolyzing chamber 10a, the liquid flows downwardly in the form containing both of cations such as calcium, sodium, magnesium and potassium ions contained (or intentionally added) in the subject water, and anions such as chlorine ion.

At this time, the concentration of residual chlorine in the electrolyzed water produced in the membraneless electrolyzing chamber 10a can be controlled by adjusting the amount of chlorine ion added and the quantity of electricity applied to the subject water, and particularly, in the apparatus for producing electrolyzed water, the concentration of chlorine ion, even if it has been fixed, can be controlled in a wide range by properly changing the conditions such as the size of the electrode plate, the distance between the electrode plates, the current value and the like. For example, if the concentration of residual chlorine is desired to be increased with the amount of chlorine ion added and the size of the electrolytic cell maintaining fixed, the number of the membraneless electrolyzing chambers 10a may be increased, and/or the distance between the electrode plates may be increased.

On the other hand, in the anode chamber formed adjacent the membraneless electrolyzing chamber 10a, a reaction represented by a following reaction formula:

$$2\ H_2O \rightarrow 4\ H^+ + O_2\uparrow + 4\ e^-$$

occurs, so that the concentration of hydrogen ion is increased to provide electrolyzed acidic water. In the cathode chamber, a reaction represented by a following reaction formula:

$$2 H_2O + 2 e^- \rightarrow 2 OH^- + H_2\uparrow$$

occurs, so that the concentration of hydroxide ion is increased to provide electrolyzed alkaline water.

The electrolyzed water flowing downwardly from the membraneless electrolyzing chamber 10a is mixed with the electrolyzed acidic water and the electrolyzed alkaline water and adjusted into a desired pH value. More specifically, the pH value of the electrolyzed water produced in the membraneless electrolyzing chamber 10a is substantially equal to that of the subject water, because of the absence of the membrane 9b partitioning cation and anion, but the pH value of the electrolyzed water removed through the outlet 5 can be controlled by mixing the electrolyzed water with the electrolyzed acidic water and electrolyzed alkaline water produced respectively in the anode chamber 10 and the cathode chamber 11.

Figure 28:
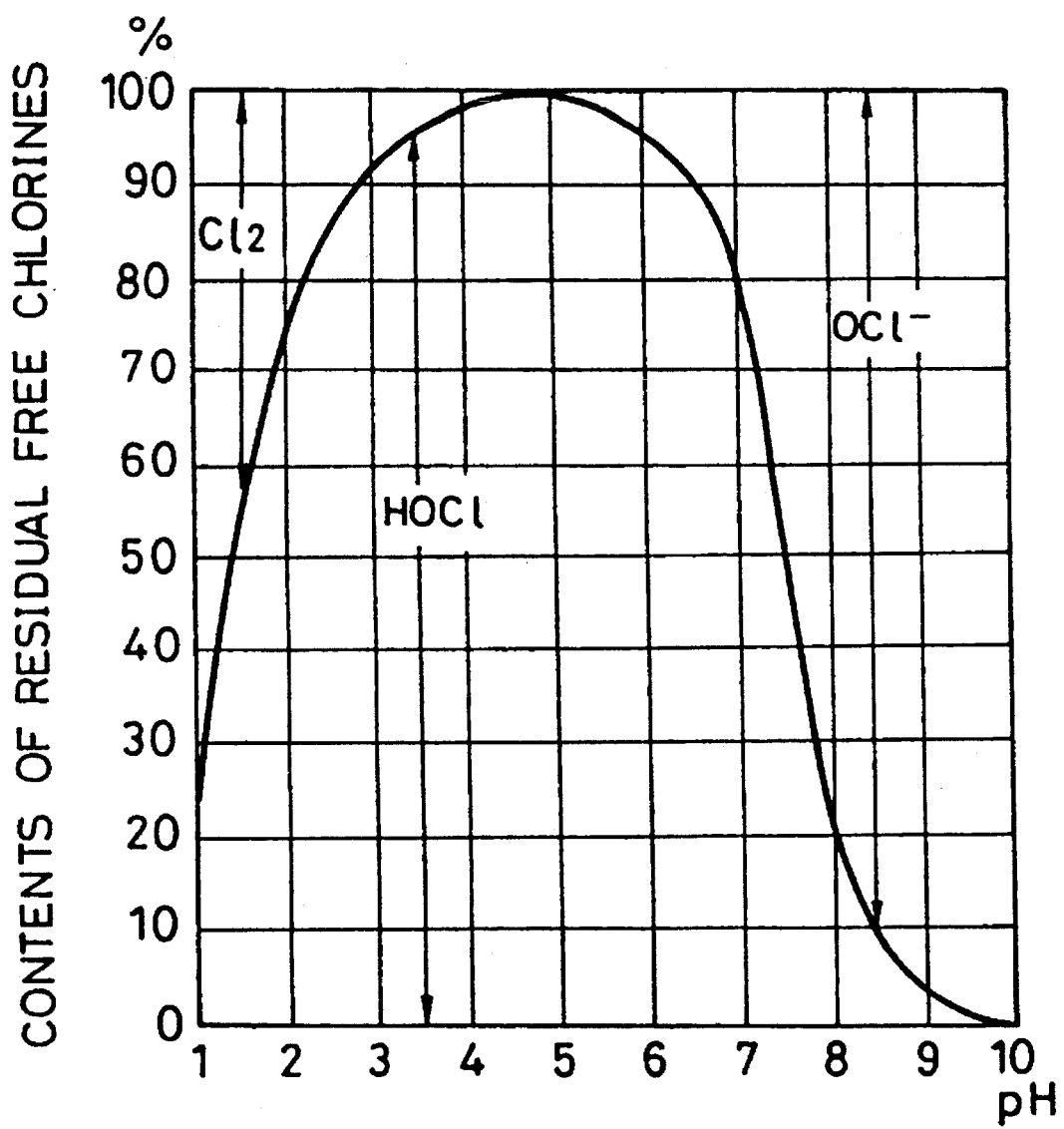
FIG. 28 is a graph illustrating the content of residual free chlorine relative to the pH value.

For example, hypochlorous acid HClO is contained in the electrolyzed water produced in the membraneless electrolyzing chamber 10a, as described above, but the content of hypochlorous acid HClO is varied depending upon the pH value, as shown in FIG. 28. The content of hypochlorous acid HClO most excellent in disinfecting or sterilizing power is larger at a pH value in a range 3 to 7. Therefore, when the electrolyzed water is to be used for disinfection or sterilization, the pH value thereof may be adjusted by mixing the electrolyzed acidic water produced in the anode chamber 10 with the electrolyzed water produced in the membraneless electrolyzing chamber 10a. In this case, the concentration of residual chlorine is previously controlled in the membraneless electrolyzing chamber 10a.

In addition, when the disinfecting or sterilizing power is less required, but it is desired that the corrosive property is suppressed to prevent the rusting of a pump or a piping, it is preferable to use weakly electrolyzed alkaline water having a pH value on the order of 7 to 8. In such a case, the electrolyzed alkaline water produced in the cathode chamber 11 is mixed with the electrolyzed water produced in the membraneless electrolyzing chamber 10a and containing hypochlorous acid to adjust the pH value to 7 to 8.

In this way, with the apparatus for producing electrolyzed water according to the present embodiment, it is possible to control the concentration of residual chlorine in the membraneless electrolyzing chamber 10a to bring out characteristics possessed by chlorine, while at the same time, controlling the pH value of the finally obtained electrolyzed water by the pH value of the electrolyzed acidic water produced in the anode chamber 10 and the electrolyzed alkaline water produced in the cathode chamber 11.

Figure 16:
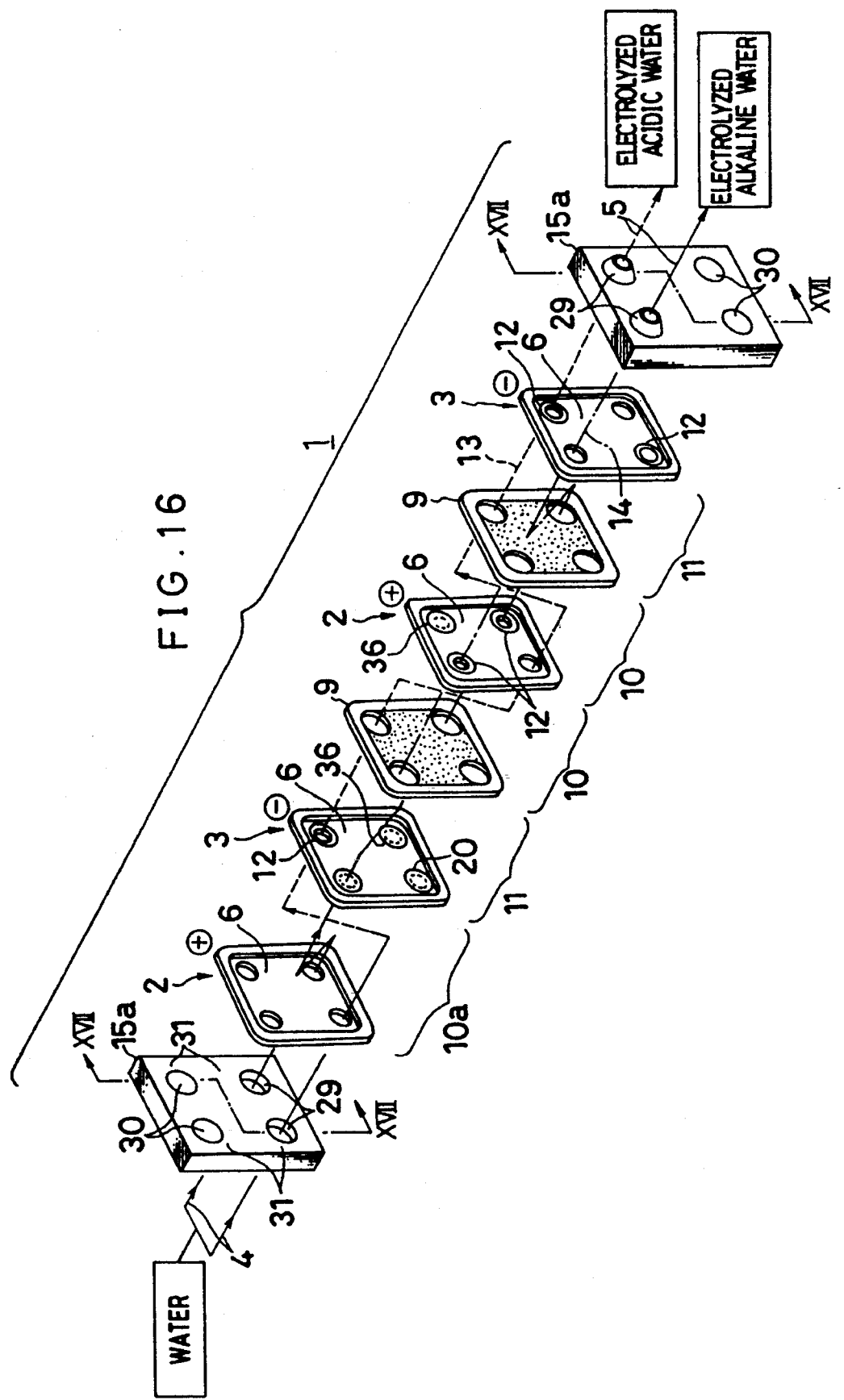
FIG. 16 is an exploded perspective view showing a still further embodiment with a membrane electrolyzing chamber included in part according to the present invention.
Figure 17:
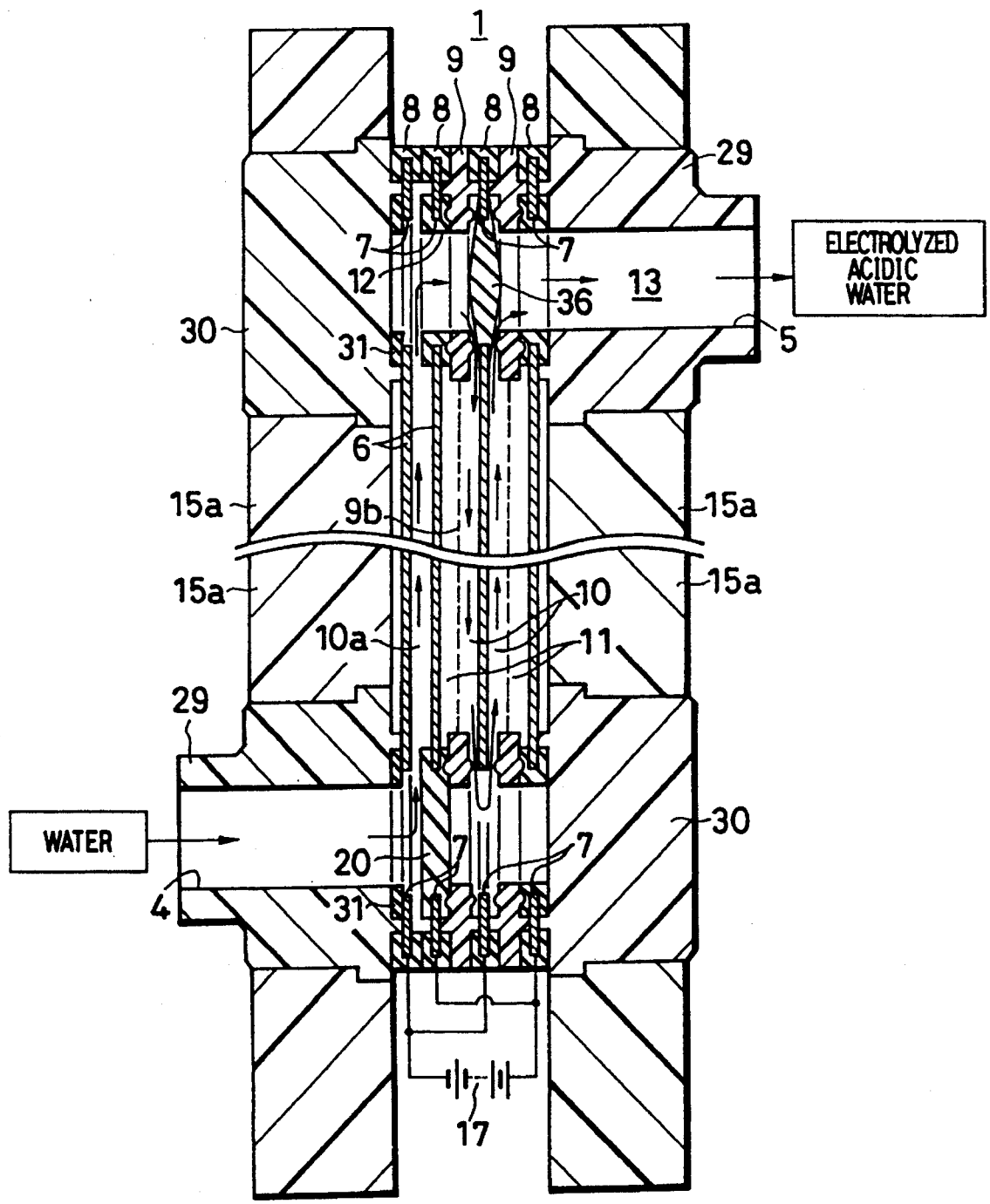
FIG. 17 is a sectional view taken along a line XVII—XVII shown in FIG. 16.

The apparatus for producing electrolyzed water shown in FIGS. 14 and 15 is suitable, when it is used as a relatively large flow rate type, but it should be appreciated that when this producer is desired to be used as a relatively small flow rate type, the position and type of the packings 12, 20, 36 to be mounted in the through-holes 7 in the electrode plates 6 are changed, as shown in FIGS. 16 and 17. Thus, a flow passage configuration (a so-called serial flow passage configuration) is formed in which the subject water introduced through the inlet 4 into the electrolytic cell 1 flows successively in a zigzag direction from the membraneless electrolyzing chamber 10a adjacent the inlet 4, rather than being successively diverted to pass the membraneless electrolyzing chamber 10a, each anode chamber 10 and each cathode chamber 11. If the flow passage is formed in series in this manner, the flow resistance is increased and hence, it is preferable to use the apparatus for producing electrolyzed water as the relatively small flow rate type. However, if the number of the electrode plates 6 and the membrane plates 9 laminated is increased even if the area of the electrode plate is small, a required pH value can be insured, leading to an advantage that the size of the electrolytic cell 1 can be reduced.

Figure 18:
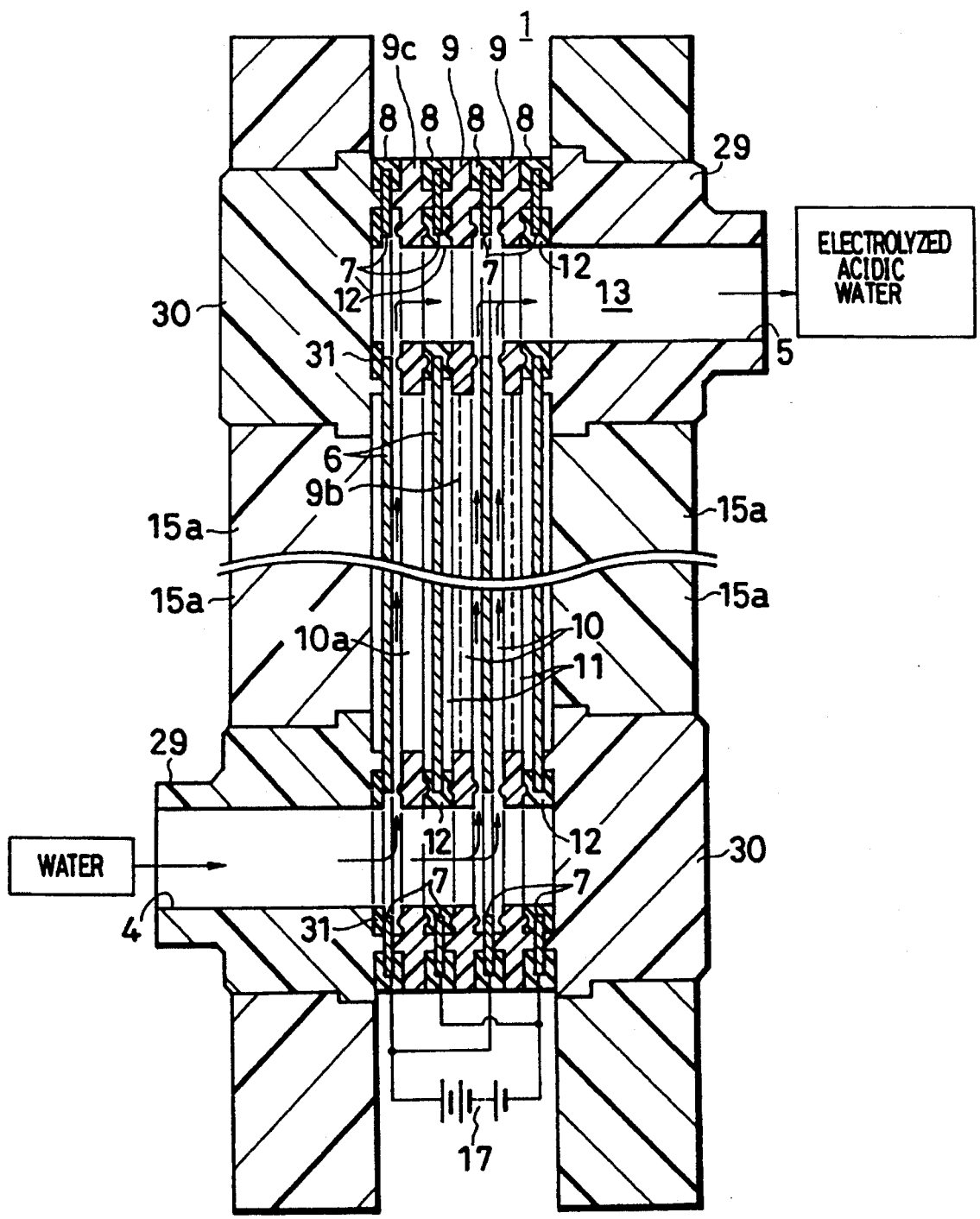
FIG. 18 is an sectional view showing a still further embodiment with a membrane electrolyzing chamber included in part according to the present invention.

If the distance between the electrode plates in the membraneless electrolyzing chamber 10a is larger, the concentration of residual chlorine is larger. Therefore, when the distance between the electrode plates is desired to be increased more than the thickness of the sealing packing 8, a spacer may be interposed between the anode plate 2 and the cathode plate 3 in the membraneless electrolyzing chamber 10a. In this case, a membrane plate 9c with the membrane 9b omitted can be fabricated and laminated between the anode plate 2 and cathode plate 3, for example, as shown in FIG. 18. The membrane 9b of the membrane plate 9 is embedded in the plate by an insert molding and hence, if the insertion of the membrane is omitted during the insert molding, it is possible to produce a spacer without a need for fabricating a special mold.

A second embodiment will be described below.

Partition Plate 6'

Referring to first to FIGS. 19 and 20, a heat exchanger H, C, R includes a partition plate 6' which is formed from the same plate material as the electrode plate 6 in the above-described apparatus for producing electrolyzed water.

More specifically, the partition plate 6' is made, for example, by coating (which may be performed by calcination) a surface of a titanium plate with a thin film of platinum or an alloy of platinum and iridium, as is the electrode plate 6 shown in FIG. 3, and has through-holes 7 opened in four corners thereof. The through-holes 7 in the partition plate 6' are opened in symmetry, so that there is no difference between the top and the bottom.

Sealing Packing(Sealing Member)

A sealing packing (i.e., a sealing member) 8 is fitted around a peripheral edge of the partition plate 6'. This sealing packing 8 is identical to the sealing packing 8 (see FIG. 3) used in the apparatus for producing electrolyzed water and formed from a rubber such as EPDM.

When several partition plates 6' are put together (laminated), as shown in FIG. 20, opposite surfaces of the sealing packing 8 are brought into press contact with the sealing packings 8 of the adjacent partition plates 6' to insure a sealability. When components which will be described hereinafter have been assembled, these sealing packings 8 constitute a peripheral wall of a heat exchange cell (which is comprised of two-line heat exchange chambers 10' and 11').

It should be noted that an annular ridge 19 is formed in an inner surface of the sealing packing 8 over the entire periphery of the sealing packing 8 for enhancing the sealability to the partition plate 6' when the latter has been fitted, as shown in FIG. 3B.

Packing, Turn Attachment and Centering Sleeve

Figure 21A:
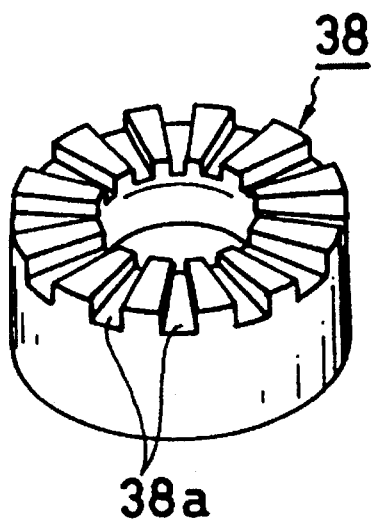
FIGS. 21A and 21B are perspective views of a turn attachment in accordance with the present invention, respectively.
Figure 21B:
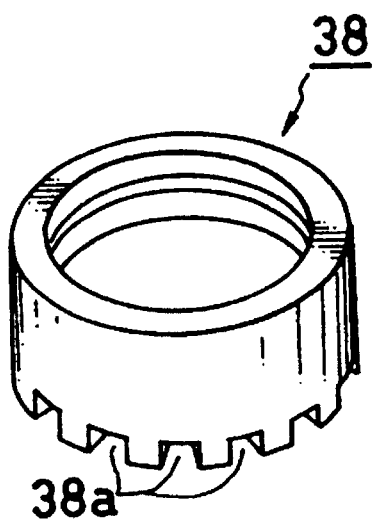
Figure 21C:
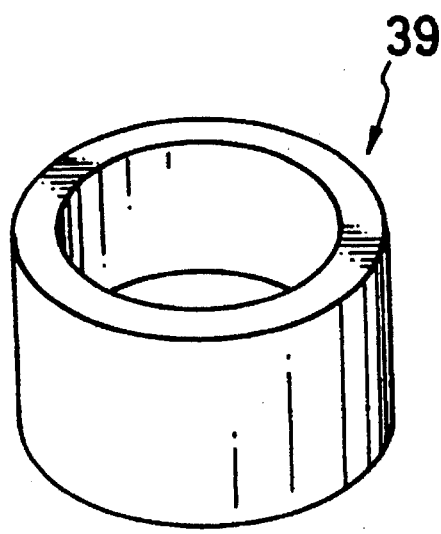
FIG. 21C is a perspective view of a sleeve in accordance with the present invention, respectively.

A liquid conduit packing 31 shown in FIG. 7D, a turn attachment 38 shown in FIGS. 21A and 21B and a centering sleeve 39 shown in FIG. 21C may be mounted selectively, as desired, in through-holes 7 opened in the partition plate 6'.

The through-packing 12 permits a subject water W (i.e., a liquid to be heat-exchanged) introduced through an inlet 4 to be passed therethrough as it is, but blocks a flow of the subject water from the heat exchange chambers 10' and 11' into the through-hole 7 with the through-packing 12 mounted therein.

On the other hand, the turn attachment 38 is a member formed into a cylindrical shape, as shown in FIGS. 21A and 21B, for example, from a synthetic resin, and has radial slits 38a in its surface shown in FIG. 21A, with its back shown in FIG. 21B being formed so that the turn attachment 38 can be fitted over the through-packing 12. Thus, if the turn attachment 38 is fitted over the through-packing 12, and the partition plates 6' (the first and second partition plates from the left, the third and fourth partition plates from the left, or the first and second partition plates from the right) are laminated, as shown in FIG. 20, the surface of the turn attachment 6' is put into abutment against the partition plate 6', so that the subject water W can pass the slits 38a made in the surface.

The centering sleeve 39 shown in FIG. 21C is a cylindrical member formed so that it can be mounted with its surface and back fitted over the through-packings 12. The centering sleeve 39 is formed, for example, from a synthetic resin, as is the turn attachment. The centering sleeve 39 is mounted to contact surfaces of the through-packings (on the second third partition plates from the left shown in FIG. 20, or the fourth and fifth partition plates from the left) which are desired to block the passage of the subject water W introduced through the inlet 4, thereby achieving the centering of the two through-packings 12, 12 to ensure the face contact of the through packing 12. The centering sleeve 39 is mounted in order to enhance the sealability of the through-packing 12 and therefore, can be omitted in the heat exchanger according to the present invention.

By properly selecting the mounting positions of the through-packing 12, the turn attachment 38 and the centering sleeve 39, the heat exchange chamber formed between the partition plates is divided into two-line heat exchange chambers 10' and 11', into one of which, for example, electrolyzed acidic water is supplied, and for example, a heating medium is supplied into the other heat exchange chamber.

Although being not shown, it is desirable that a member for generating a turbulent flow is mounted between the partition plates 6' in order to provide an enhanced agitatability in the heat exchange chambers 10' and 11' formed by laminating a plurality of the partition plates 6'. In this case, the partition plate 6' may be formed at the sacrifice of the common use of the partition plate 6' and the electrode plate 6, but using the same material as the electrode plate 6, a turbulent flow generating member may be formed separately from the partition plate 6'. By sandwiching such a turbulent flow generating member, it is possible to enhance the heat exchanging ability performed on the surface and back sides of the partition plate 6' by an agitating effect, and to eliminate an air pocket which is liable to be accumulated in each of the heat exchange chambers 10' and 11'.

Frame

In the heat exchangers H, C, R, when the partition plates 6' have been laminated, frames 15a, 15b are mounted on both sides of the assembly of these plates, as shown in FIGS. 19 and 20. The material and shape of the frame 15a or 15b are particularly not limited, if the frame 15a or 15b is of a structure capable of insuring a rigidity. It is desirable to use a frame 15a or 15b which can be also used as the frame used in the apparatus for producing electrolyzed water (see FIG. 5).

Figure 6A:
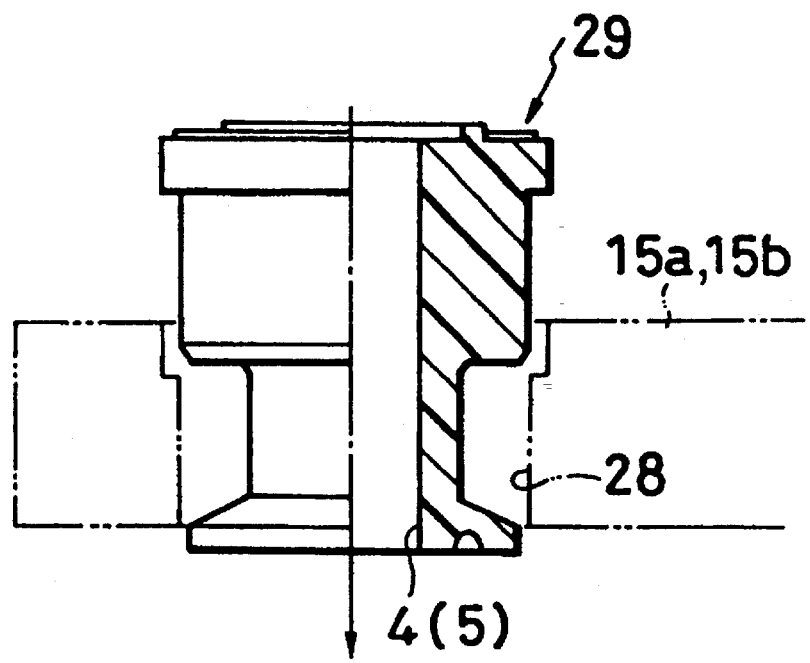
FIG. 6A is a partially sectional view of a liquid conduit adapter used in the frame shown in FIG. 5.
Figure 6B:
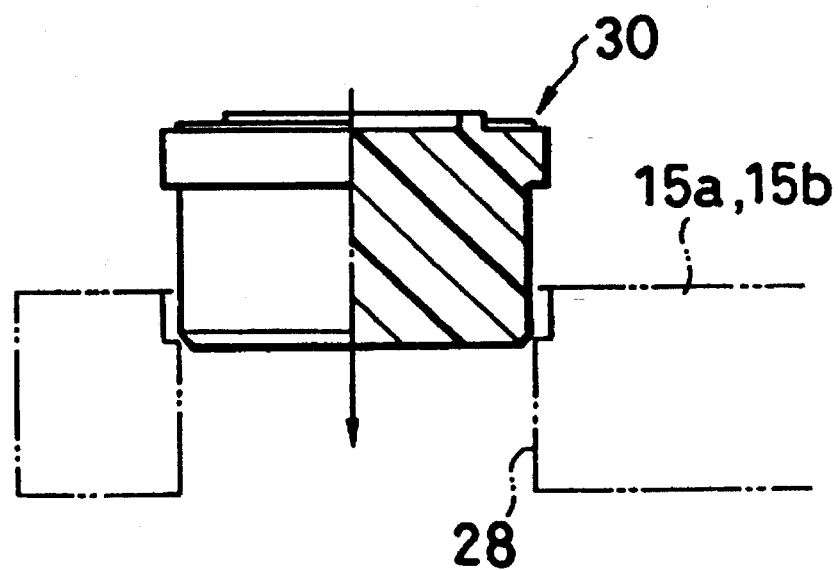
FIG. 6B is a partially sectional view of a liquid conduit plug likewise used in the frame.

As shown in FIG. 5, through-holes 28 are opened in the frame 15a or 15b at four corners thereof to align with the through-holes 7 opened in the partition plate 6', and a liquid conduit adapter 29 shown in FIG. 6A or a liquid conduit plug 30 shown in FIG. 6B may be mounted selectively, as required, in each of the through-holes 28. The liquid conduit adapter 29 forms the inlet 4 or the outlet 5 for the subject water W. The liquid conduit plugs 30 may be mounted in the other through-holes 28 to close the flow passage.

The frame 15a or 15b in the present embodiment is formed vertically and laterally symmetrically and moreover, any of the liquid conduit adapter 29 and the liquid conduit plug 30 can be selectively mounted in the through-hole 28 and hence, the liquid conduit adapter 29 and the liquid conduit plug 30 can be freely selected in accordance with conditions such as the specification, the application, the mounting place and the like of an electrolyzed water producing apparatus with a heat exchanger constructed by various combinations of these heat exchangers H, C and R with the above-described apparatus for producing electrolyzed water.

A liquid conduit packing 31 as shown in FIG. 7D is mounted to each of the liquid conduit adapter 29 and the liquid conduit plug 30 to enhance the sealability between the frame 15a or 15b and the partition plate 6' adjacent such frame 15a or 15b. Particularly, if an annular projection 32 is formed on the liquid conduit packing 31, as shown in FIG. 7D, it is brought into close contact with the periphery of the through-hole 7 in the partition plate 6', thereby enhancing the sealability between the frame 15a or 15b and the through-hole 7 in the partition plate 6.

A rib 33 is continuously formed on the frame 15a or 15b to abut against the seal packing 8 mounted to the partition plate 6'. This also insures the sealability between the entire partition plate and the frame.

Through-holes 34 are defined as bolt-insertion holes in a periphery of the frame 15a or 15b and thus, the heat exchanger H, C, R of this embodiment is assembled by laminating the partition plates 6', disposing the frames 15a and 15b on opposite sides of the resulting assembly of the partition plates 6', respectively, and then inserting bolts through these bolt-insertion holes 34 to tighten them. Alternatively, the frame 15a or 15b may be coupled to the assembly of the partition plates by other fastening means other than the bolts, such as a clamp.

It should be noted that in the present invention, the above-described frame 15a or 15b is necessarily not required, and for example, the heat exchange cell 1 constructed by lamination of, for example, the partition plates 6' may be fixed directly to a desired place (a wall or another device).

In this way, the heat exchanger H, C, R of this embodiment is designed to perform an heat exchanger function in a construction comprising necessary and minimal components in varied combinations, as is the above-described apparatus for producing electrolyzed water and therefore, it is possible not only to provide a reduction in cost by reducing the number of components and using the general-purpose components, but also to modify the specification of the heat exchanger.

Following applications are possible, for example, when the heat exchanger is desired to be used as a relatively large flow rate type (see FIGS. 19 and 20), as a relatively small flow rate type (see FIGS. 22 and 23), or as another type.

Figure 22:
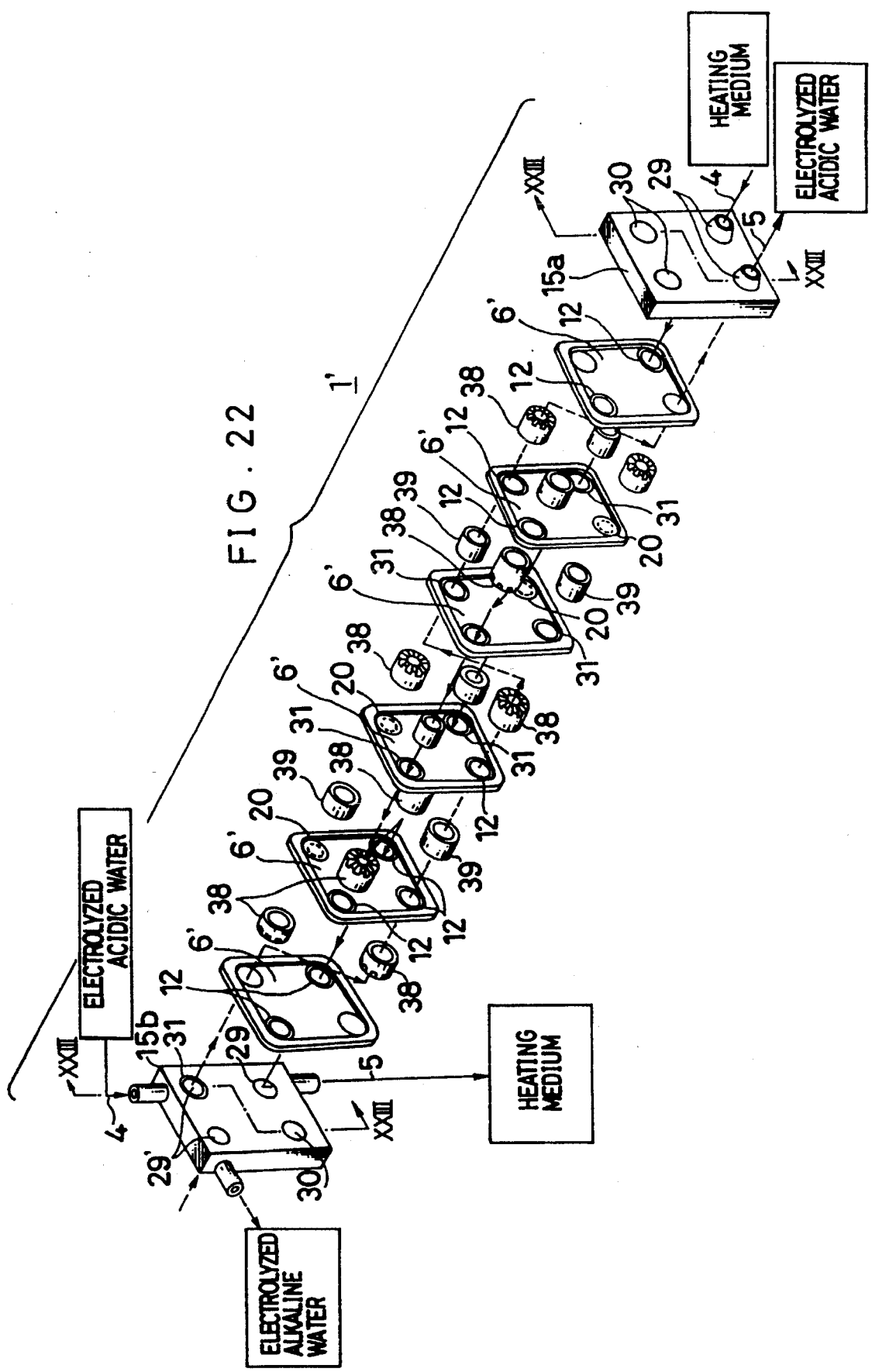
FIG. 22 is an exploded perspective view of a heat exchanger according to another embodiment of the present invention.
Figure 23:
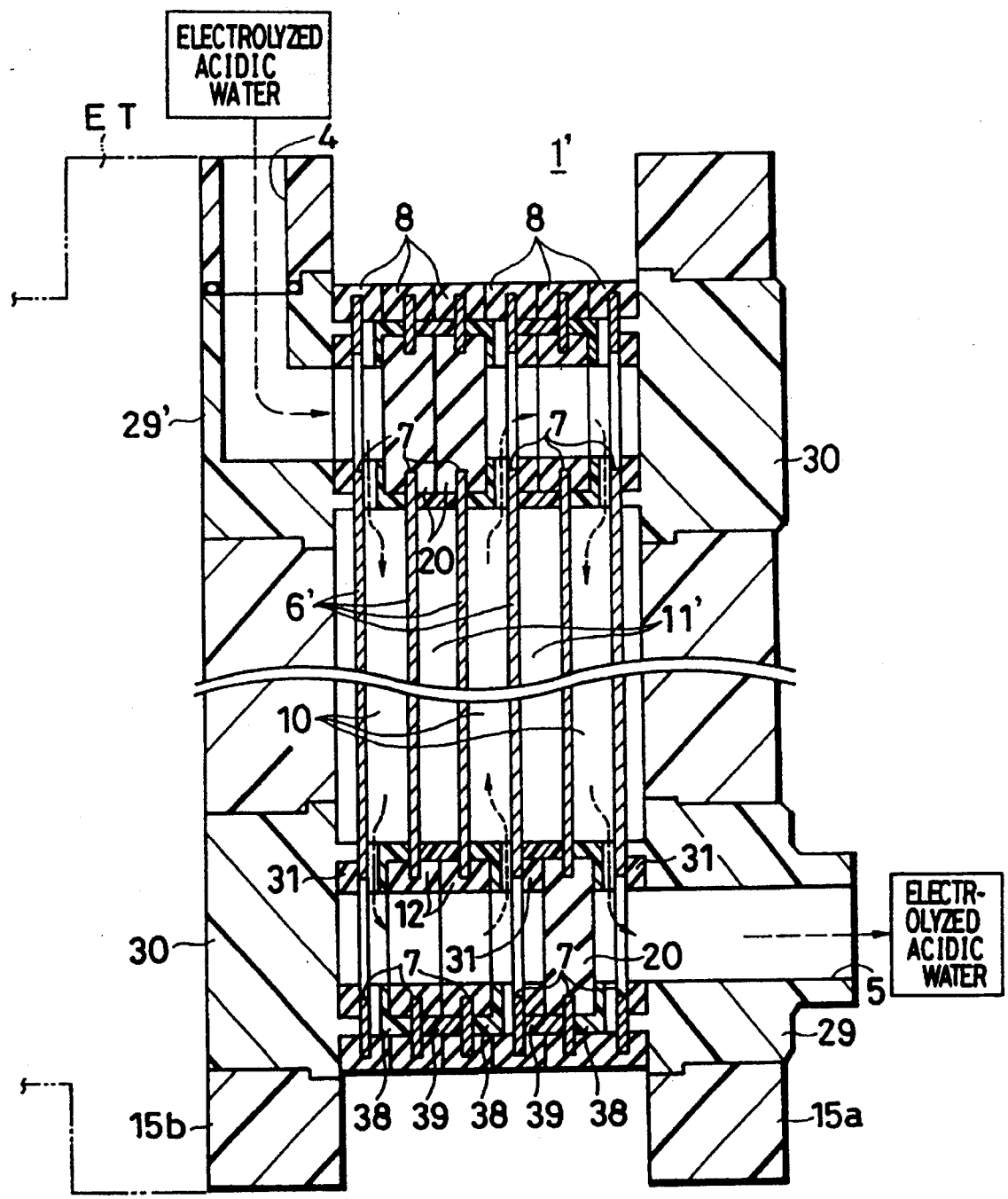
FIG. 23 is a sectional view taken along a line XXIII—XXIII shown in FIG. 22.
Figure 24A:
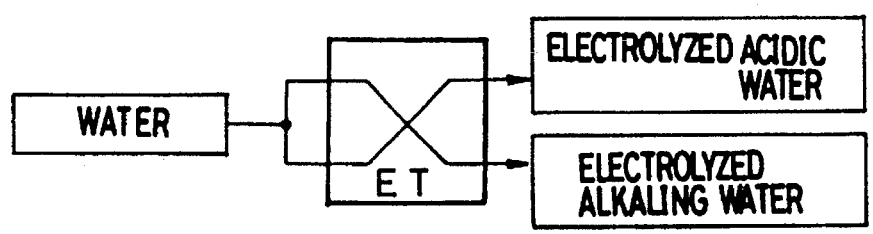
FIG. 24A is a diagrammatic illustration of a apparatus for producing electrolyzed water.
Figure 24B:
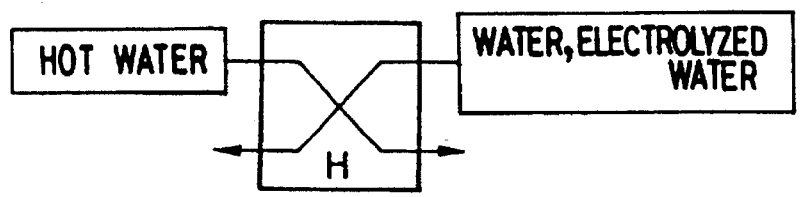
FIG. 24B is a diagrammatic illustration of a heater in accordance with the present invention.
Figure 24C:
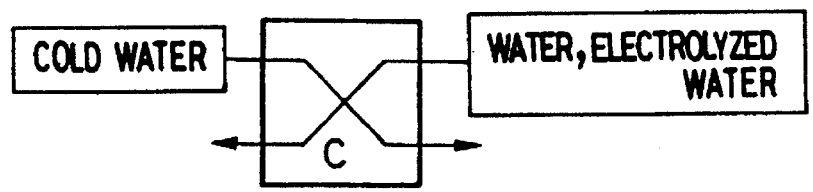
FIG. 24C is a diagrammatic illustration of a cooler in accordance with the present invention.
Figure 24D:
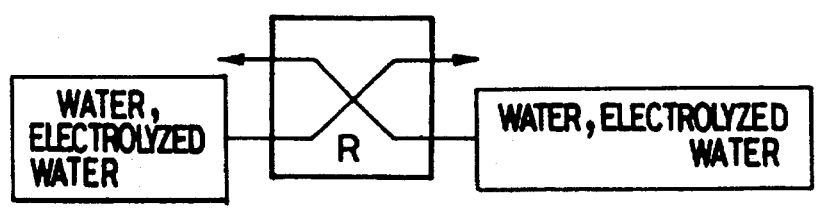
FIG. 24D is a diagrammatic illustration of a usual heat exchanger in accordance with the present invention.

FIG. 19 is an exploded perspective view illustrating an embodiment of a heat exchanger applied as a relatively larger flow rate type, and FIG. 20 is a sectional view taken along a line XX—XX in FIG. 19. On the contrast, FIG. 22 is an exploded perspective view illustrating an embodiment of a heat exchanger applied as a relatively small flow rate type, and FIG. 23 is a sectional view taken along a line XXIII—XXIII in FIG. 22. In FIGS. 19 and 20 and FIGS. 22 and 23, like parts or components are designated by like reference characters. The embodiment shown in FIGS. 22 and 23 is different from the embodiment shown in FIGS. 19 and 20, in that the plug packing 20 shown in FIG. 7B is mounted in addition the through-packing 12, the turn attachment 38 and the centering sleeve 30 shown in FIGS. 19 and 20, and in various considerations of the mounting positions of these components, the flow passages for the heating medium and the subject water are modified.

In the heat exchanger shown in FIGS. 19 and 20, the subject water introduced through the inlet into the heat exchange cell, if the flow rate thereof is large, is successively diverted to pass the individual heat exchange chambers in parallel. Therefore, this heat exchanger is preferred for use as the relatively large flow rate type. With regard to the number of components, the heat exchanger shown in FIGS. 19 and 20 is of a construction sufficed by the through-packing 12, the liquid conduit packing 31, the turn attachment 38 and the centering sleeve 39 without use of the plug packing.

To the contrary, the lamination arrangement of the partition plates and the like in the heat exchanger shown in FIGS. 22 and 23 is the same as that in the embodiment shown in FIGS. 19 and 20, except for a difference in that the plug packing 20 is employed in addition to the through-packing 12, the liquid conduit packing 31, the turn attachment 38 and the centering sleeve 39 which are mounted in the through-holes 7 in the partition plate 6'. Thus, either the heating medium and the subject water are passed through the heat exchange chambers in series. Therefore, the heat exchanger shown in FIGS. 22 and 23 is preferred to be used as the relatively small flow rate type, and is advantageous in that if the number of the partition plates 6' laminated is increased even if the area of the partition plate 6' is small, a required heat exchange effectiveness can be insured.

Apparatus For Producing Electrolyzed water with Heat Exchanger

The respective constructions and operations of the apparatus for producing electrolyzed water and the heat exchanger according to the present invention have been described above, and embodiments will be described below as comprising various combinations of the apparatus for producing electrolyzed water and the heat exchanger.

FIG. 24 is a diagrammatic illustration of an apparatus for producing electrolyzed water and a heat exchanger according to the present invention, wherein "ET" designates an electrode plate-laminated apparatus for producing electrolyzed water of the above-described type; "H" designates a heater (using a heating medium) of the heat exchangers; "C" designates a cooler (using a cooling medium) of the heat exchangers; "R" designates a usual heat exchanger using no special heating or cooling medium, wherein any of the heater, the cooler and the usual heat exchanger is a partition plate-laminated heat exchanger.

Figure 25A:
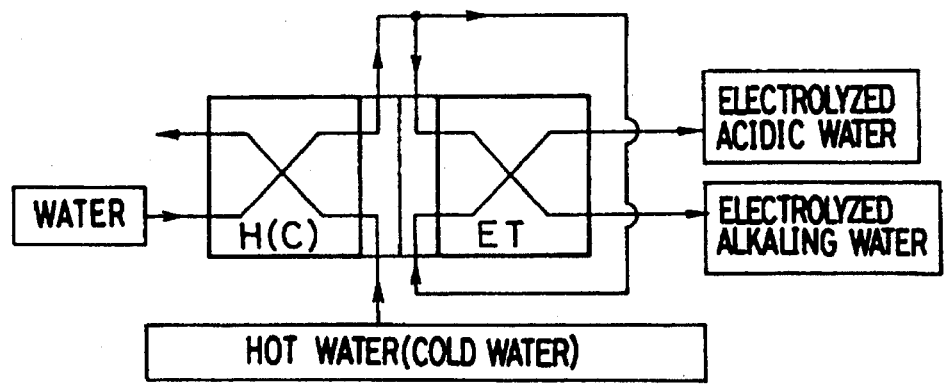
FIGS. 25A to 25C are diagrammatic illustrations of embodiments of apparatus for producing electrolyzed water with heat exchangers according to the present invention, respectively.
Figure 25B:
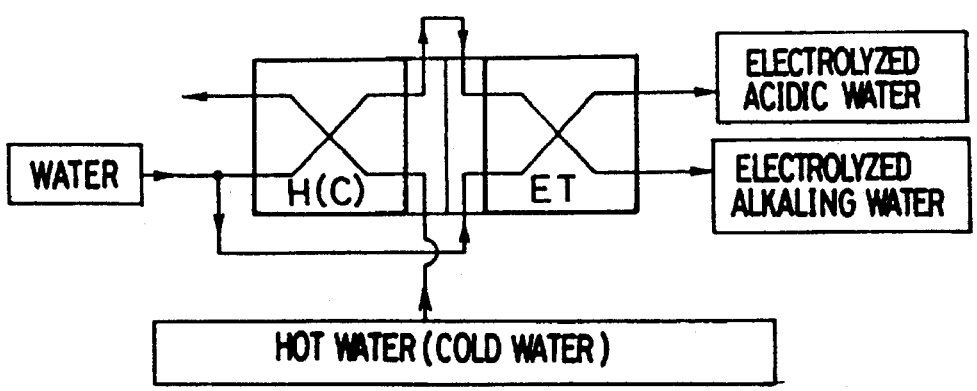
Figure 25C:
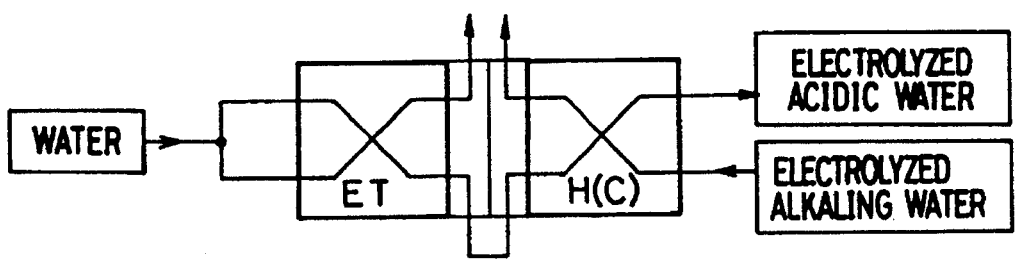

First, in the embodiment shown in FIGS. 25A to 25C, the temperature of a subject water is adjusted to a desired temperature in the heater H (or the cooler C), and the thus-provided subject water is supplied into the apparatus for producing electrolyzed water ET, where electrolyzed acidic water and electrolyzed alkaline water are produced. In this case, all the subject water may be subjected to the control of temperature in the heat exchanger H (C) and then electrolyzed, as shown in FIG. 25A, or only a part of the subject water may be subjected to the control of temperature in the heat exchanger H (C), and the temperature-controlled liquid and a temperature-uncontrolled subject water may be subjected to an electrolysis in the apparatus for producing electrolyzed water ET.

In the former case, the heat exchange effectiveness in the heat exchanger H (C) is inferior to that in the latter case, but it is possible to maintain constant the temperature of the subject water supplied to the apparatus for producing electrolyzed water ET by increasing the flow rate of the heating medium. For example, the electrolysis can be carried out at a temperature which permits a most effective electrolysis.

Alternatively, as shown in FIG. 25C, the subject water may be first supplied into the apparatus for producing electrolyzed water ET where electrolyzed acidic water and electrolyzed alkaline water may be produced, and then, only the required electrolyzed water (the electrolyzed acidic water in FIG. 25C) may be supplied into the heat exchanger H (C) where the temperature thereof may be adjusted to a desired temperature. In this case, the subject water adjusted to the desired temperature may be supplied prior to delivery.

Figure 26A:
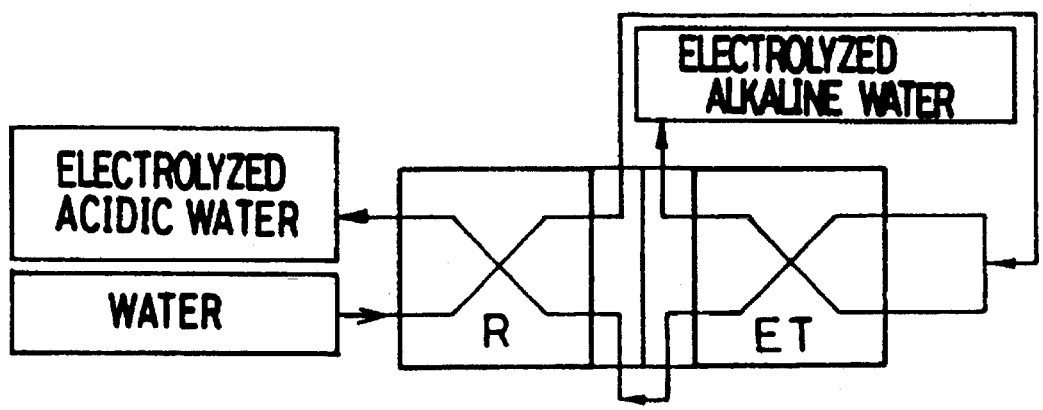
FIGS. 26A and 26B are diagrammatic illustrations of other embodiments of the present invention, respectively.
Figure 26B:
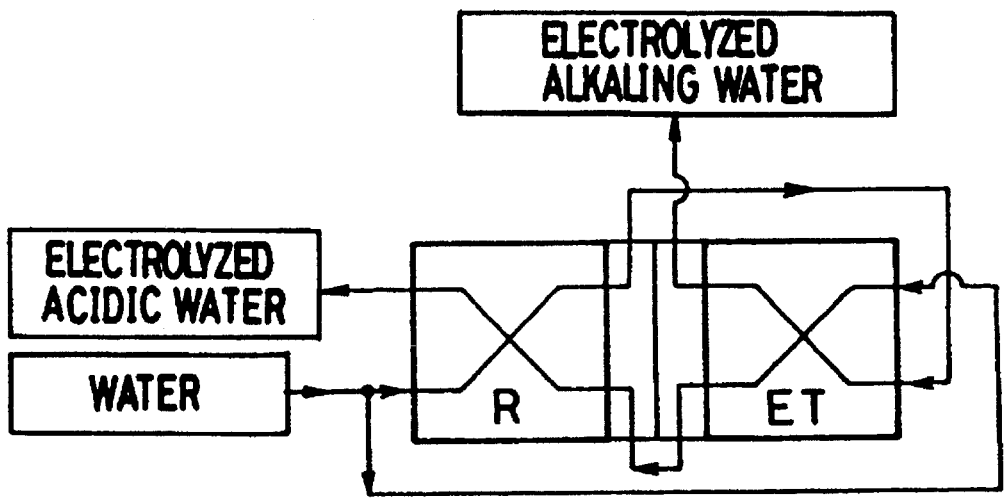

On the other hand, electrolyzed water producing apparatus shown in FIGS. 26A and 26B are intended to perform a heat exchange by utilizing a latent heat of a subject water without use of a special heating medium. More specifically, the subject water passed through the heat exchanger R is supplied to the apparatus for producing electrolyzed water ET where electrolyzed acidic water and electrolyzed alkaline water are produced, but the temperatures of the electrolyzed acidic water and the electrolyzed alkaline water are risen by a several degree from that of the subject water by an electrolytic action. Thereupon, if the electrolyzed water (the electrolyzed acidic water in the embodiments shown in FIGS. 26A and B) is supplied into the heat exchanger R, where it is subjected to a heat exchange with the subject water used as a heating medium, the electrolyzed acidic water is cooled to gradually approximate the temperature of the subject water. The embodiment shown in FIG. 26B has a heat exchange effectiveness enhanced by reducing the flow rate of the subject water supplied into the heat exchanger R. In the embodiments shown in FIGS. 26A and 26B, the electrolyzed acidic water is cooled, while the electrolyzed alkaline water is put into waster or the like, but it should be appreciated that any electrolyzed water may be selected in the present invention.

Figure 27A:
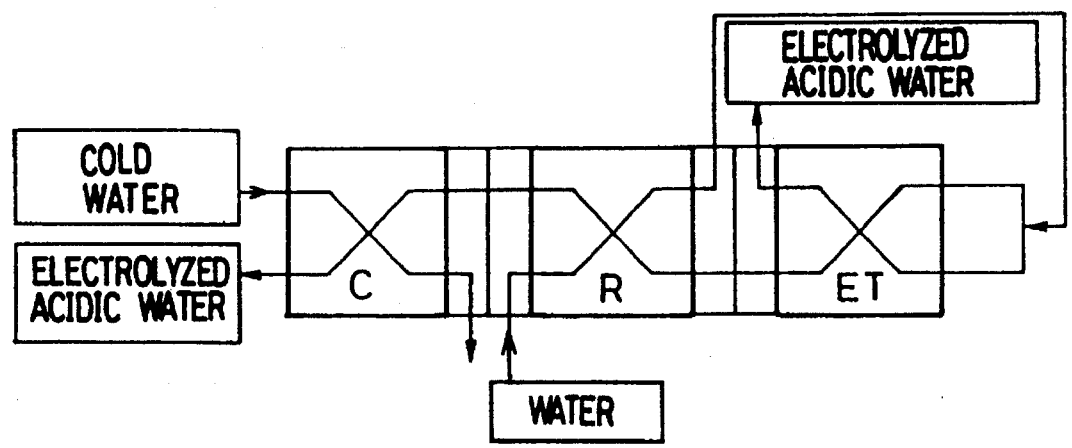
FIGS. 27A and 27B are diagrammatic illustrations of further embodiments of the present invention, respectively.

FIG. 27A illustrates an embodiment in which an apparatus for producing electrolyzed water ET is combined with a plurality of heat exchangers C and R. In this embodiment, a subject water passed through the heat exchanger R is subjected to an electrolysis in the apparatus for producing electrolyzed water ET, and a resulting electrolyzed alkaline water is returned to the heat exchanger R, where it is cooled by the subject water used as a heating medium. The electrolyzed alkaline water cooled down to near the temperature of the subject water in this manner is further passed into the heat exchanger (cooler) C, where it is cooled to a desired temperature by a heat exchange with a heating medium (a cold water).

Figure 27B:
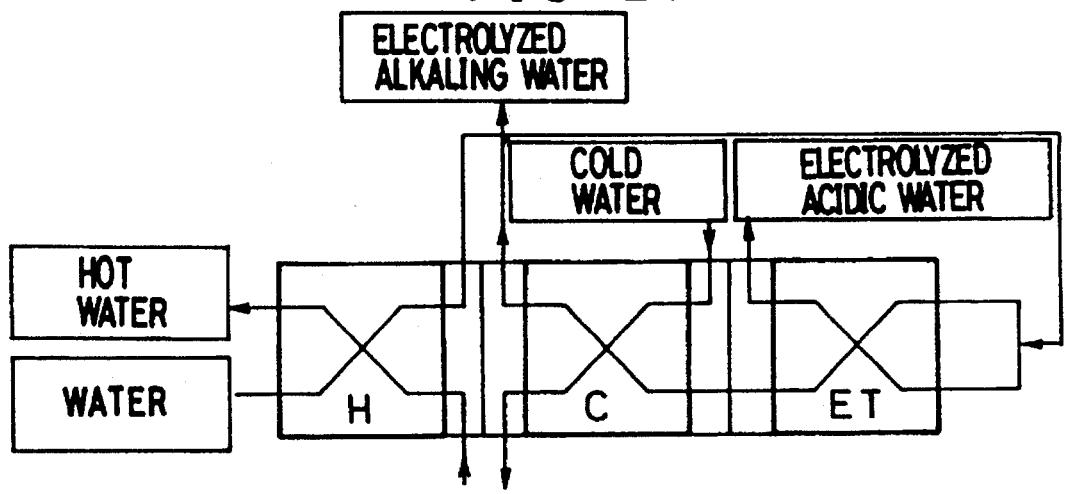

An embodiment shown in FIG. 27B is also comprised of a combination of an apparatus for producing electrolyzed water ET with a plurality of heat exchangers H and C. In this embodiment, subject water is once supplied into the heat exchanger (heater) H, where it is once heated. The heated subject water is supplied into the apparatus for producing electrolyzed water ET, where it is electrolyzed effectively at a temperature suitable for an electrolysis. Then, a resulting electrolyzed alkaline water is introduced into the heat exchanger (cooler) C, where it is cooled down to a desired temperature. Prior to delivery, this cooled water is supplied as a low temperature electrolyzed alkaline water. In this way, the electrolyzed water producing apparatus according to the present invention is an extremely flexible system provided by various combinations of the above-described apparatus for producing electrolyzed water with the heat exchangers H, C and R, thereby enabling an electrolyzed water to be delivered at a temperature most suitable for an application.

The embodiments of the present invention have been described to facilitate the understanding of the present invention, but are not intended to limit the present invention. Therefore, the elements or components disclosed in the above-described embodiments are intended to embrace all modifications and equivalents in design within the technical scope of the invention defined in claims.

What is claimed is:

1. An apparatus for producing electrolyzed water: comprising an electrolytic cell, wherein said electrolytic cell includes a first electrode plate having a first through-hole and a fourth through-hole, a second electrode plate having a second through-hole and a fifth through-hole, a third electrode plate having a third through-hole and a sixth through-hole, a first sealing member, a second sealing member, a first intermediate plate, and a second intermediate plate, said electrolytic cell includes a first sub-electrolytic-cell and a second sub-electrolytic-cell, said first sub-electrolytic-cell is constructed of said first electrode plate, said second electrode plate and said first sealing member, with said first sealing member interposed between said first and second electrode plates, to define, between said first and second electrode plates, a first electrolytic chamber for electrolyzing subject water to be electrolyzed therein, said second sub-electrolytic cell is constructed of said second electrode plate, said third electrode plate and said second sealing member, with said second sealing member interposed between said second and third electrode plates, to define, between said second and third electrode plates, a second electrolytic chamber for electrolyzing subject water to be electrolyzed therein, said first and second intermediate plates are provided in each of said first and second electrolytic chambers, respectively, each of said first and second intermediate plates respectively includes a membrane permitting a selective passage of ions, said first electrolytic chamber is divided into a first anode chamber and a first cathode chamber by said first intermediate plate, said first anode chamber is formed between said first intermediate plate and one of said first and second electrode plates which is connectable to said anode, said first cathode chamber is formed between said first intermediate plate and the other of said first and second electrode plates which is connectable to said cathode, said second electrolytic chamber is divided into a second anode chamber and a second cathode chamber by said second intermediate plate, said second anode chamber is formed between said second intermediate plate and one of said second and third electrode plates which is connectable to said anode, said second cathode chamber is formed between said second intermediate plate and the other of said second and third electrode plates which is connectable to said cathode, the first through-hole serves as an inlet for introducing subject water into one of said first anode chamber and said first cathode chamber, the fourth through-hole serves as an inlet for introducing subject water into the other of said first anode chamber and said first cathode chamber, the second through-hole serves as an outlet for discharging electrolyzed water out of said one of said first anode chamber and said first cathode chamber, the fifth through-hole serves as an outlet for discharging electrolyzed water out of said the other of said first anode chamber and said cathode chamber, the second through-hole also serves as an inlet for introducing subject water into one of said second anode chamber and said second cathode chamber, the fifth through-hole also serves as an inlet for introducing subject water into the other of said second anode chamber and said cathode chamber, the third through-hole serves as an outlet for discharging electrolyzed water out of said one of said second anode chamber and said second cathode chamber, and the sixth through-hole serves as an outlet for discharging electrolyzed water out of said the other of said second anode chamber and said cathode chamber.

2. An apparatus for producing electrolyzed water according to claim 1, wherein said electrolytic cell further includes a sealing plug disposed in one of said second and fifth through-holes in said second electrode plates, and said one of said first anode chamber and said first cathode chamber communicates with said one of said second anode chamber and said second cathode chamber through said sealing plug.

3. An apparatus for producing electrolyzed water according to claim 1, wherein subject water flows in parallel in both said one of said first anode chamber and said first cathode chamber, and said one of said second anode chamber and said second cathode chamber.

4. An apparatus for producing electrolyzed water according to claim 1, wherein said apparatus further includes a chlorine supply source for producing an aqueous solution of hypochlorous acid.

5. An apparatus for producing electrolyzed water according to claim 4, further comprising a second electrolytic cell, and wherein said chlorine supply source is said second electrolytic cell, and said second electrolytic cell is a membraneless electrolytic cell, and is constructed of a fourth electrode plate, a fifth electrode plate and a third sealing member, with said sealing member interposed between said fourth and fifth electrode plates, to define, between said fourth and fifth electrode plates, a third electrolytic chamber for electrolyzing subject water to be electrolyzed therein.

6. An apparatus for producing electrolyzed water according to claim 5, wherein said first and second anode chambers, said first and second cathode chambers and said third electrolytic chamber are connected in parallel to one another in a flow passage for subject water to be electrolyzed.

7. An apparatus for producing electrolyzed water having a plurality of juxtaposed electrolytic cells, each of said electrolytic cells comprising:

a first electrode plate having at least one through-hole for allowing the electrolyzed water to flow through;

a second electrode plate located adjacent to said first electrode plate and having at least one through-hole for allowing the electrolyzed water to flow through, said first electrode plate and said second electrode plate defining said electrolytic cell; and an intermediate plate located in said electrolytic cell for selectively passing ions thereby dividing said electrolytic cell into a anode chamber and a cathode chamber.

8. An apparatus for producing electrolyzed water, comprising:

a first electrode plate having at least one through-hole for allowing the electrolyzed water to flow through;

a second electrode plate located adjacent to said first electrode plate and having at least one through-hole for allowing the electrolyzed water to flow through;

a third electrode plate located between said first electrode plate and said second electrode plate having at least one through hole for allowing the electrolyzed water to flow through, said first electrode plate and said third electrode plate defining a first electrolytic cell, said second electrode plate and said third electrode plate defining a second electrolytic cell; and an intermediate plate located in each of said first electrolytic cell and said second electrolytic cell for selectively passing ions thereby dividing each of said first electrolytic cell and said second electrolytic cell into a anode chamber and a cathode chamber.

* * * * *